(12) United States Patent
Hodge

(10) Patent No.: US 6,224,127 B1
(45) Date of Patent: May 1, 2001

(54) MODIFIED TAILGATE

(76) Inventor: William O. Hodge, 7850 Theodore Dawes Rd. Lot #13, Theodore, AL (US) 36582

( * ) Notice: Subject to any disclaimer, the term of this patent is extended or adjusted under 35 U.S.C. 154(b) by 0 days.

(21) Appl. No.: 09/304,184

(22) Filed: May 3, 1999

Related U.S. Application Data

(63) Continuation-in-part of application No. 09/041,070, filed on Mar. 10, 1998.
(60) Provisional application No. 60/089,797, filed on Jun. 18, 1998.

(51) Int. Cl.[7] .................................................. B60P 3/00
(52) U.S. Cl. ........................ 296/26.08; 296/50; 248/244; 248/235; 182/150
(58) Field of Search ................................ 269/296; 296/3, 296/26.09, 26.11, 26.12, 7, 26.02, 26.08, 50, 51; 224/405, 548, 560, 552, 522, 523, 531, 532, 564, 546; 248/241, 243, 244, 235; 108/44, 46, 47, 139, 140, 142, 135, 152; 182/82, 150, 206

(56) References Cited

U.S. PATENT DOCUMENTS

| | | | |
|---|---|---|---|
| 252,381 | * | 1/1882 | Hyre ...................................... 224/401 |
| 1,307,610 | * | 6/1919 | Yeagley ................................. 248/244 |
| 2,883,137 | * | 4/1959 | Weber .................................... 248/243 |
| 3,278,149 | * | 10/1966 | Brucker ............................ 248/241 X |
| 3,295,473 | * | 1/1967 | Wentworth ........................... 108/152 |
| 3,794,183 | * | 2/1974 | Colbridge ......................... 248/243 X |
| 4,957,185 | * | 9/1990 | Courchesne et al. ................ 182/150 |
| 4,958,594 | * | 9/1990 | Swagerty ......................... 248/243 X |
| 5,662,254 | * | 9/1997 | Lemajeur et al. .................... 296/3 X |
| 5,713,620 | * | 2/1998 | Port .......................................... 296/3 |
| 5,931,429 | * | 8/1999 | Helwig et al. ........................ 248/235 |

* cited by examiner

Primary Examiner—Dennis H. Pedder

(57) ABSTRACT

A tool holding table mountable onto a car or truck exterior surface frame member, such as the brackets for holding a tailgate is described. Preferably the mounting surface is the tailgate of a truck. The table provides a cutting surface defining an opening for receiving a blade, for example a saw blade so that the blade interrupts the cutting surface so that it may cut material on the cutting surface. The table is also equipped with at least one saw horse. It also provides a power source which allows for it to be operated from a switch on the ground or the side. The saw table is preferably the same size as the vehicle tailgate when folded and unfolds to be large enough to support standard lengths of material to be cut.

9 Claims, 16 Drawing Sheets

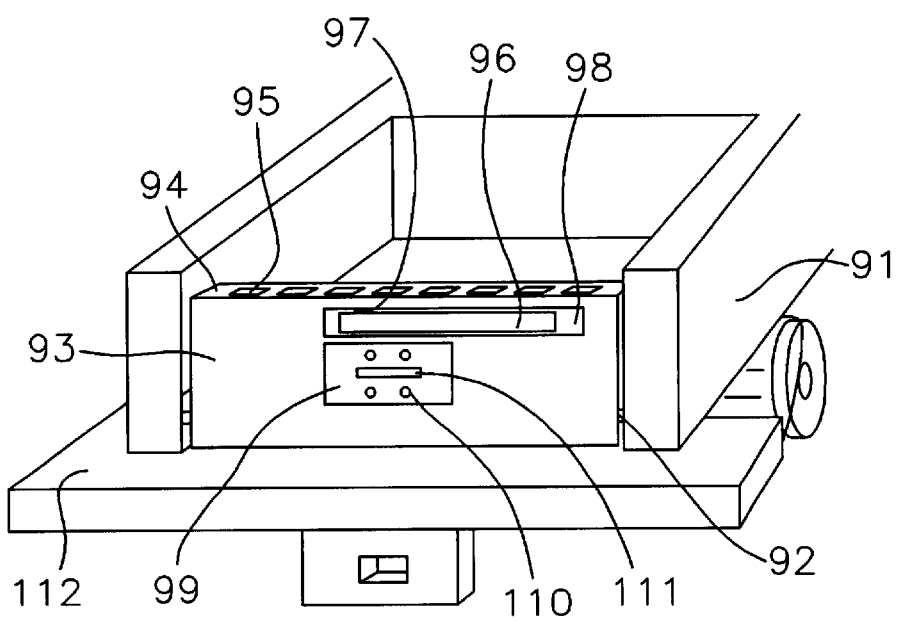
Fig. 12-A
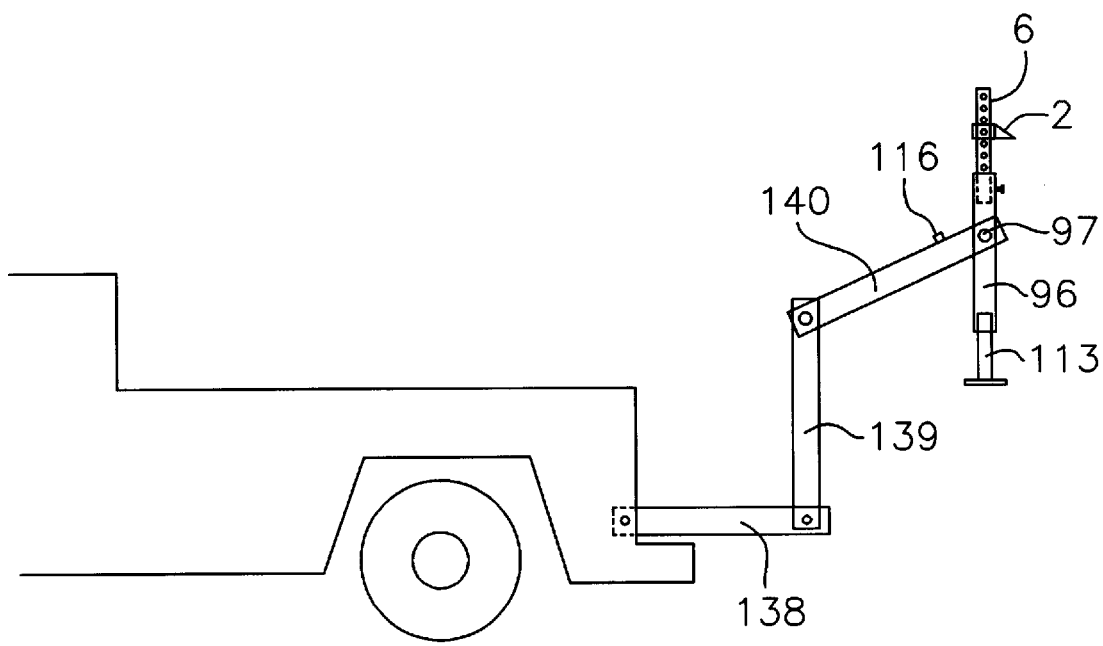
Fig. 18

MODIFIED TAILGATE

PRIORITY STATEMENT

This patent is a continuation in part of provisional application serial number 60/089,797 filed Jun. 18, 1998 and utility patent 09/041,070 filed Mar. 10, 1998.

BACKGROUND OF THE INVENTION

The present invention related to a saw table or saw horse type cutting surface. More particularly, the present invention relates to a cutting surface mountable to a vertical surface.

PRIOR ART

| PATENT NO. | TITLE | INVENTOR | DATE |
|---|---|---|---|
| 5,090,335 | TABLE FOR TRUCK BED | Kenneth R. Russell | 02/25/92 |
| 4,951,991 | TELESCOPING TRUCK BED EXTENSION | Dale C. Haigler | 08/28/90 |
| 4,705,254 | ADJUSTABLE AND REMOVABLE VICE STAND STAND ASSEMBLY FOR MOTOR VEHICLES | Mark G. Swanson | 11/10/87 |
| 4,029,245 | AUTOMOBILE MATERIAL CARRIER | David L. Berlin | 06/14/77 |
| 1,756,629 | EXTENDIBLE VISE SUPPORT | A. W. Campbell | 04/29/30 |
| 5-319164 | (JAPAN) WORKING VEHICLE MOUNTED WITH LONG ARTICLE WORKING | Akihiro Murakami | 12/03/93 |
| 1-282040 | (JAPAN) RECEIVING TABLE DEVICE FOR VEHICLE | Ryosuke Okawa | 11/13/89 |
| 2,468,579 | EXTENSIBLE LOAD-SUPPORTING MEANS FOR TRUCKS | H. Vuori | 04/26/49 |
| 5,451,088 | COMBINATION FRAME-SUPPORT BOX RECEIVING & SELF-STABILIZING BED EXT. | Robert L. Broad | 09/19/95 |
| 5,433,566 | TAILGATE-MOUNTED STABILIZING APPARATUS | Douglas B. Bradley | 07/18/95 |
| 5,267,748 | VEHICLE TOOL PLATFORM APPARATUS AND METHOD | Charles F. Curran | 12/07/93 |
| 5,533,771 | MULTIPLE PURPOSE TRUCK TAILGATE APPARATUS | Shepard Taylor; Seabrook Taylor | 07/09/96 |
| 5,458,389 | DEVICE FOR EXTENDING THE BED OF A TRANSPORT VEHICLE | Freddie W. Young | 10/17/95 |
| 5,575,521 | TAILGATE BOX, TABLE, AND SINK | Gregory D. Speis | 11/19/96 |
| 4,846,385 | LOCKABLE MOUNTING BRACKET FOR CHAIN SAWS | William W. Frantus | 07/11/89 |
| 4,727,777 | VEHICLE-MOUNTED SUPPORT FOR SHARPENING CHAIN SAWS | John Obester | 03/01/88 |
| 5,007,568 | TRUCK SIDEWALL MOUNTED CHAIN SAW CARRIER | Jimmy C. Da Vault | 04/16/91 |
| 5,010,978 | APPARATUS AND METHOD FOR A SAWING STAND | Scott A. Jimmerson | 04/30/91 |
| 5,490,649 | DEVISE FOR MOUNTING, SECURING AND SUPPORTING PORTABLE POWER TOOLS HAVING BED EXTENSION ASSEMBLIES | Louis N. Kusalich | 02/13/96 |
| 5,267,748 | VEHICLE TOOL PLATFORM APPARATUS AND METHOD | Charles F. Curran | 12/07/93 |
| 4,025,014 | STORAGE HOOK | Charles O. Larson | 05/24/77 |
| 2,291,381 | DISPLAY FIXTURE | C. E. Drake | 03/03/41 |
| 1,593,722 | FASTENING DEVICE FOR GUN TOOLS | B. P. Joyce | 07/27/26 |

RELATED ART

The prior art as exemplified by the other patents show various platforms which can be mounted to the flat bed of a truck, as well as certain saw holders which are shown mounted either to the bumper or in the bed of a truck for holding saws.

None of these prior art references provide for a work surface similar to that provided by two spaced sawhorses. Nor does the prior art suggest a saw horse which can sit onto or over the raised sides, tail gate or rear panel of a flat bed truck. The key elements are a pair of cutting surfaces, each of which cutting surfaces having an exposed end, and a bracket for holding the cutting surface so that the exposed ends are held parallel for cutting. An additional improvement is to use, as at least one anchor for at least one bracket as being the tailgate of a truck.

A saw horse type cutting surface is a surface which comprises at least two lengths of cut material (cuttable material such as wood) spaced at a desired distance, each being on approximately the same level from the ground level on which a piece of work (such as a length of wood) may be placed for cutting.

The prior art shows several surfaces attachable to the rear of a vehicle. The present invention differs from those in that they do not provide a holder for a cutting surface, and in most cases, do not contain parallel cutting surfaces so that they may be used in the same manner as a conventional saw horse.

The present invention provides a way for providing a transportable saw horse, which may be attached to a vehicle, and preferably the tail gate of a vehicle. Other art, such as U.S. Pat. No. 5,267,748, utilizes the rear tail gate hitch having a single tool platform to which a work tool may be secured. The inventive concept embodied in the prior art deals with various types of tables and related structures.

The prior art does not describe two parallel cutting surfaces supported by a vehicle for use as cutting surfaces.

GENERAL DESCRIPTION OF THE PREFERRED EMBODIMENT

The invention comprises a modified tailgate to receive sawhorses which mount to the tailgate as shown in the following disclosure in more detail. In addition, the tailgate provides for a position for mounting a saw or other power tool to the tailgate. Most specifically, the tailgate defines an opening to receive a blade and provides a cutting surface to hold the material, wood, steel, etc., which is to be cut. Significant to the invention is a central frame which attaches to the vehicle frame, preferably the tailgate of a vehicle. The attachment in the preferred embodiment is a magnetic bar which is useful on any tailgate as discussed in more detail below. This bar may be a non-magnetic bar bearing a magnetic strip located at the base of the tailgate. This magnetic strip or bar may also be removable for cleaning, etc.

The tool would typically be one which has a blade of some type which extends out of an opening defined by the central frame. The top of the central frame supports the item to be cut. The tool may either be suspended over the material and central frame opening or it may extend up from the bottom of the central frame into the opening. The blade may be movable within the central frame opening.

Examples of tools would be saws having saw blades, welders having welding tips, torches having torch valves (the flame being the blade); lasers having beams, drill having bits and the like. A drill held above the central frame opening so that the bits goes into the frame opening would be a predictable tool given the disclosure set out herein as would a saw moving on an arm over the opening in the central frame.

It can be seen, therefore, that while a saw and saw blade are discussed herein, blade refers to any type of blade, bit, torch, or the like attached not only to a saw but to a saw, a drill, or any type of cutting or welding device.

A portable version of the preferred embodiment comprises a saw horse type cutting surface as described above held to a vertical surface, such as the side or tailgate of a truck by a mounting means. In this embodiment, the mounting means has a bracket engaging on its inner surface, possibly, with padding along an internal surface, which can fit over or onto the vertical surface and tighten in place. The mounting means or support provides a surface for mounting a bracket means or beam which may be made in part, of cut material (primarily wood) or may receive a cut surface made of cut material. The cut material, such as a wooden two-by-four, provides a saw horse-type cutting surface when two of these elements are in place.

Hence, in the preferred embodiment, there are two mounting means supporting two brackets holding two cut surfaces. In this way two saw horses are provided.

It is therefore an object of this invention, to provide for a portable saw horse which may be utilized wherever a raised wall is present.

It is further the object of this invention to provide a saw horse which may be mounted on the tailgate, receiving hitch or side of a pick-up truck.

It is further the object of this invention to provide a sturdy, stable surface for cutting in a variety of environments.

It is further the object to provide a portable surface which can be utilized as a mounting for a table, shade, scaffolding, table saw, drill or for other purposes consistent with the disclosure set out herein.

These and other objects and improvements of the invention will become more clear from the detailed description of the preferred embodiment set forth below, as well as the figures, in which like parts have similar numbers.

DRAWINGS

FIG. 18 shows an alternate embodiment of the tailgate shown in FIG. 14.

DETAILED DESCRIPTION OF THE PREFERRED EMBODIMENT

Figure 1:
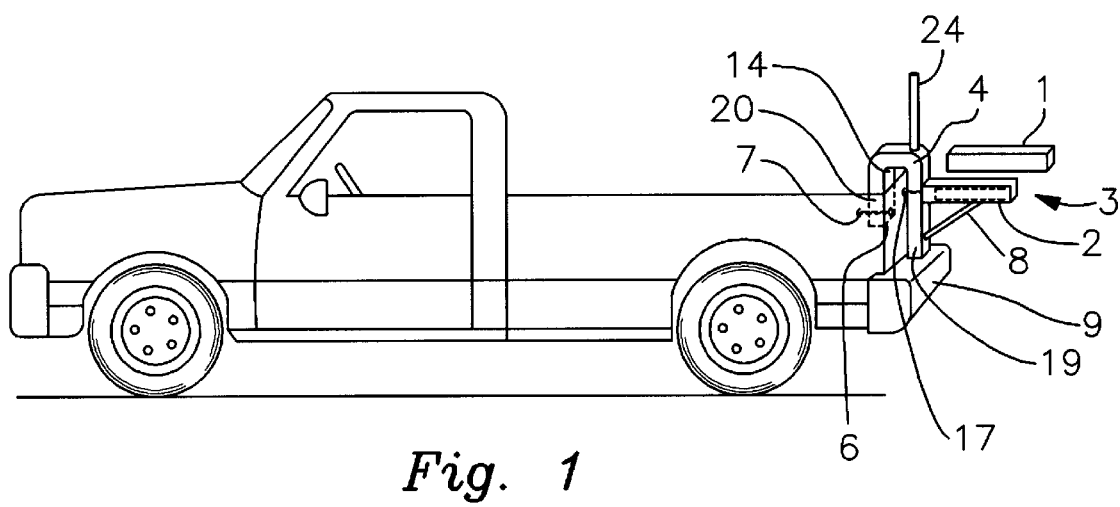
FIG. 1 is an embodiment showing the preferred embodiment in place over a truck tailgate.
Figure 12:
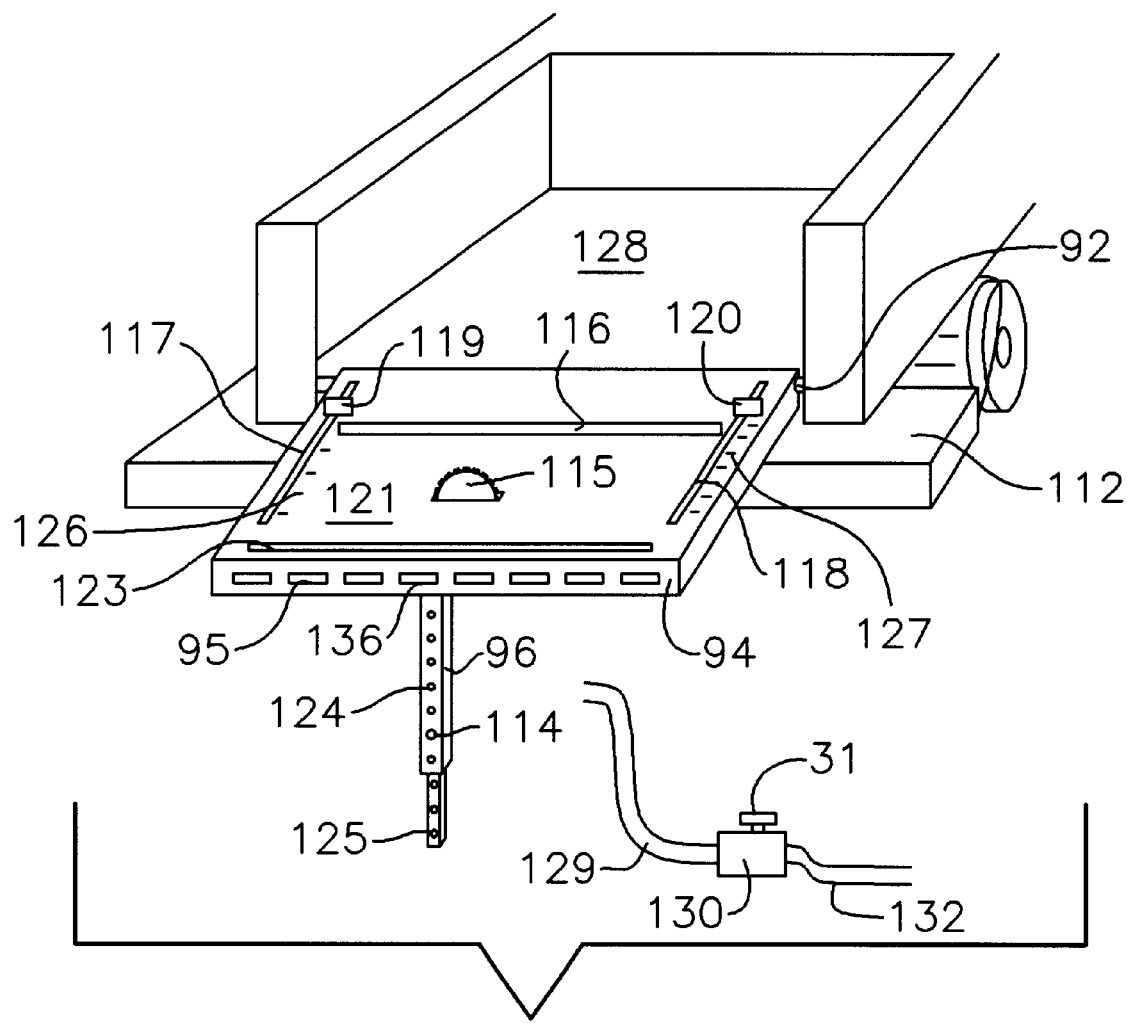
FIG. 12 is a plan view of a tailgate incorporating a saw.

As can best be seen by reference to FIG. 12, in its most simple embodiment, a saw is built into an existing tailgate. This makes the tailgate into a table saw or saw table. When the tailgate is raised as shown in FIG. 12–A, the saw is mounted by bolts through openings 10 so that the saw blade 115 fits through a slot 111 in the tailgate 93. The blade 115 then sticks up when the tailgate is let down as shown in FIG. 1.

As can best be seen by reference to FIG. 12 the invention attaches to a truck sidewall 91 by way of a hinge 92 between the sidewall 91 and the tailgate 93. This method of attachment is common and is done with several different cooperating hinge embodiments well known in the art.

The top 94 of the tailgate 93 defines slots 95. Multiple slots 95 are shown but it could equally be two or more slots or merely one long slot.

The slot 95 may receive retaining arm 33 of sawhorse bracket 34 as described in more detail below.

Support leg 96 fits into a recess 98 in tailgate 93 more than one support leg 96 may be used.

The support leg 96 pivots out on support leg pivot 97 so as to support the tailgate against the ground. In the prior art the support is typically from a strap leading from the sidewall 91 to the tailgate 93. These side straps need to be eliminated as described in more detail below.

Alternatively, this support let 96 may go to the trailer hitch or receiving hitch instead of going to the ground. For reasons described in other embodiments, this may not be desirable.

An extension 113 is provided for the support leg 96 so that the height from the ground to the support leg may be adjusted to provide for variations between the height of the tailgate and sloping grounds, etc. Since alternate embodiments have two support legs, each holding a sawhorse bracket in the preferred embodiment as described in more detail below, if there is some give in the hinge 92 where it receives the tailgate (or the tailgate where it receives the hinge 92, or the tailgate after it is hinged) then greater leveling of the tailgate is possible. A level 136 may be provided on the tailgate to show it is level.

In order to allow for the length of the extension to be adjusted relative to the support leg 96 there are holes 124 in the support leg which match up with holes 125 in extension 113 and distance is secured by a bolt 114.

In addition the bumper 112 may also provide support for the tailgate 93.

Figure 15:
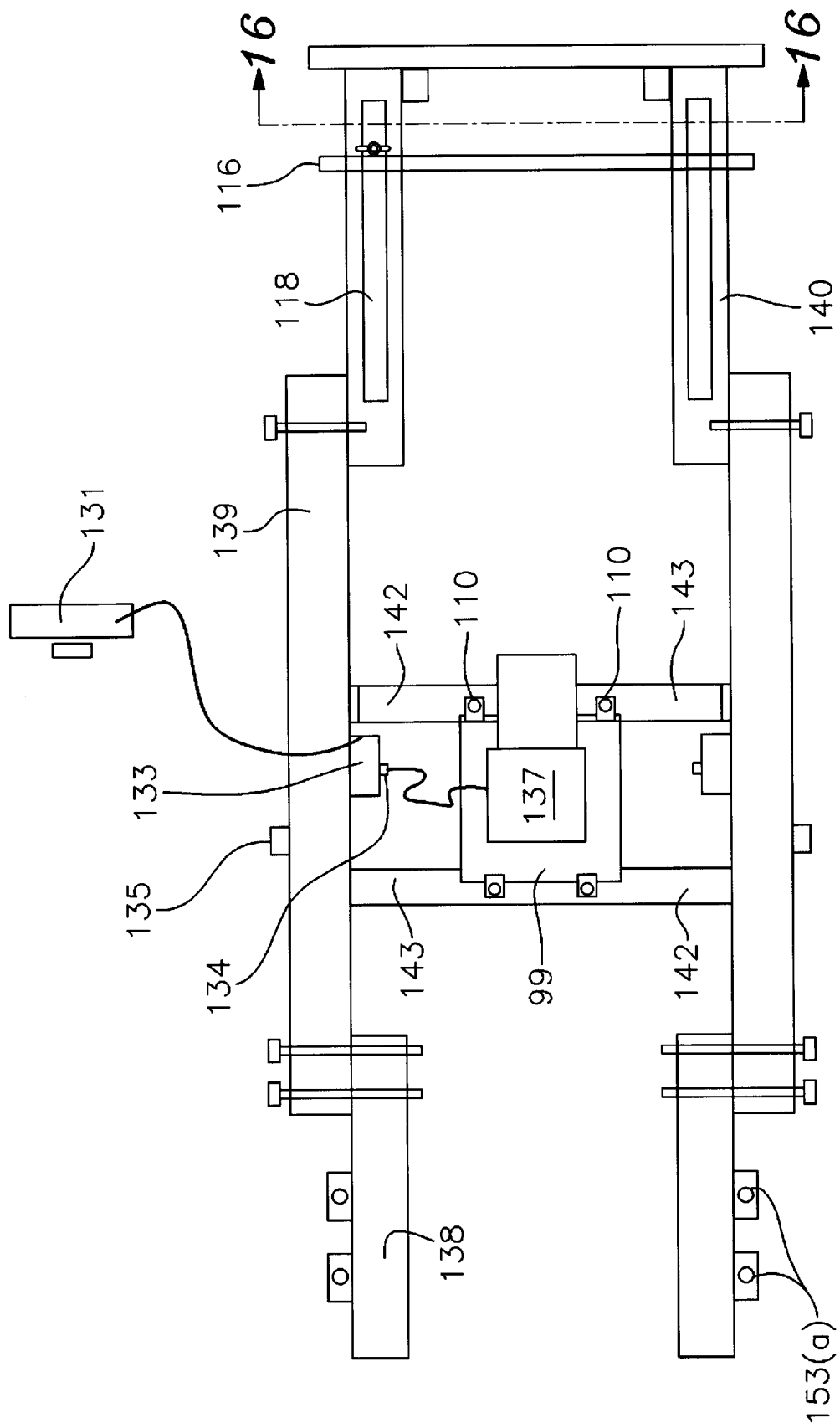
FIG. 15 is a bottom view of the tailgate shown in FIG. 14. A slide mechanism is shown which would be on the top of the tailgate.

One important modification in the tailgate 93 is a recessed plate 99 for receiving a power saw. The recessed plate 99 may define bolt holes 110 into which bolts may be driven to bolt a saw to the recessed plate 99. Referring to FIG. 15, it can be seen that the recessed plate 99, may be the safety plate of the saw 137 and the bolt holes 110, may be in the underside of a portion of the tailgate 93 (in this case, the left arm 142 and right arm 143 described in more detail below with reference to FIG. 15).

Figure 2:
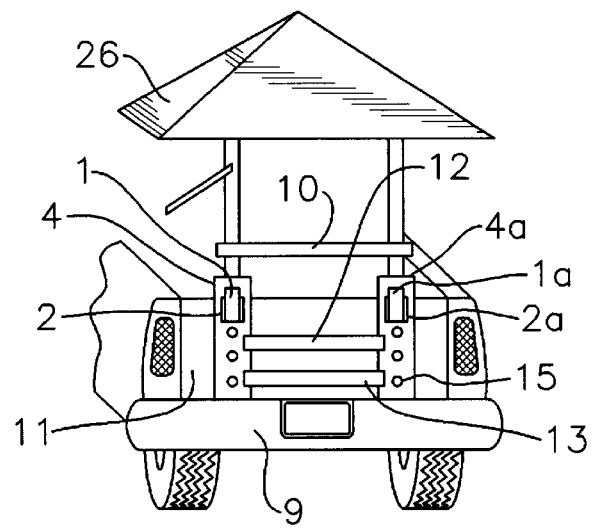
FIG. 2 is a rear view of the embodiment shown in FIG. 1.

A saw blade slot 111 is defined in the recessed plate 99 which saw blade slot 111 can receive the saw blade 115 as shown in FIG. 2.

The inside surface 121 of the tailgate 93 is further modified to provide for left guide slot 117 and right guide slot 118 into which left flat face slide 119 and right flat face slide 120 may be slid. A bar 116 may be put in place between left and right guides 119 and 120 against which a wooden member which is to be cut can be pushed. Similarly it may be pushed against the guides themselves to the extent that they can function for that purpose. In most cases a rod 116 will be necessary and this rod must either be permanently attached or detachably attached to the guides 119 and 120.

In order to control the distance the guides 119 and 120 move along a measured ruler marker 127 which shows how many inches the bar 116 is from the saw blade 115.

In practice the guides and bars are put at the appropriate distance for the cut desired from the saw blade 115. The saw is activated and the woods are slid along the rod 116 and into the path of the saw blade 115 with cuts made as desired.

In order to control the power to the saw and in order to allow the saw to be activated the invention also envisions at the plug 129 from the saw which is permanently powered when in place against the base plate to be plugged into a pedal operated power switch 130 which has a power line 132 to the saw. In this way when the user puts his foot on the pedal 131 the saw is activated and when he either intentionally or accidently removes his foot from the pedal 131 the saw is cut off in order to prevent accidental running of the saw.

The pedal 131 may be mounted onto the side of the tailgate so that a user might not accidently step on the pedal. An alternative safety measure would be to require that a kick out 135 be removed by the user prior to pushing the pedal down. Yet another switching mechanism which might be used would be an auxiliary switch 135 as shown in FIG. 15 which would have to be pushed prior to pushing the pedal 131 or within a certain period of time before using the pedal 131.

As can also be seen by this embodiment the sawhorse holding bar 133 may also be inserted into the guide slots 118 and 117 in order to either lengthen the tailgate or to provide a sawhorse type cutting surface for other work after the initial sawing is done.

The outside wall of the tailgate 122 may define a guide for a tailgate. The top of the tailgate may define a slot 123. Marker 126 may correspond to marker 127. The truck bed 128 may be on the level with the tailgate as is known if prior art or may be slightly raised or lowered.

Figure 13:
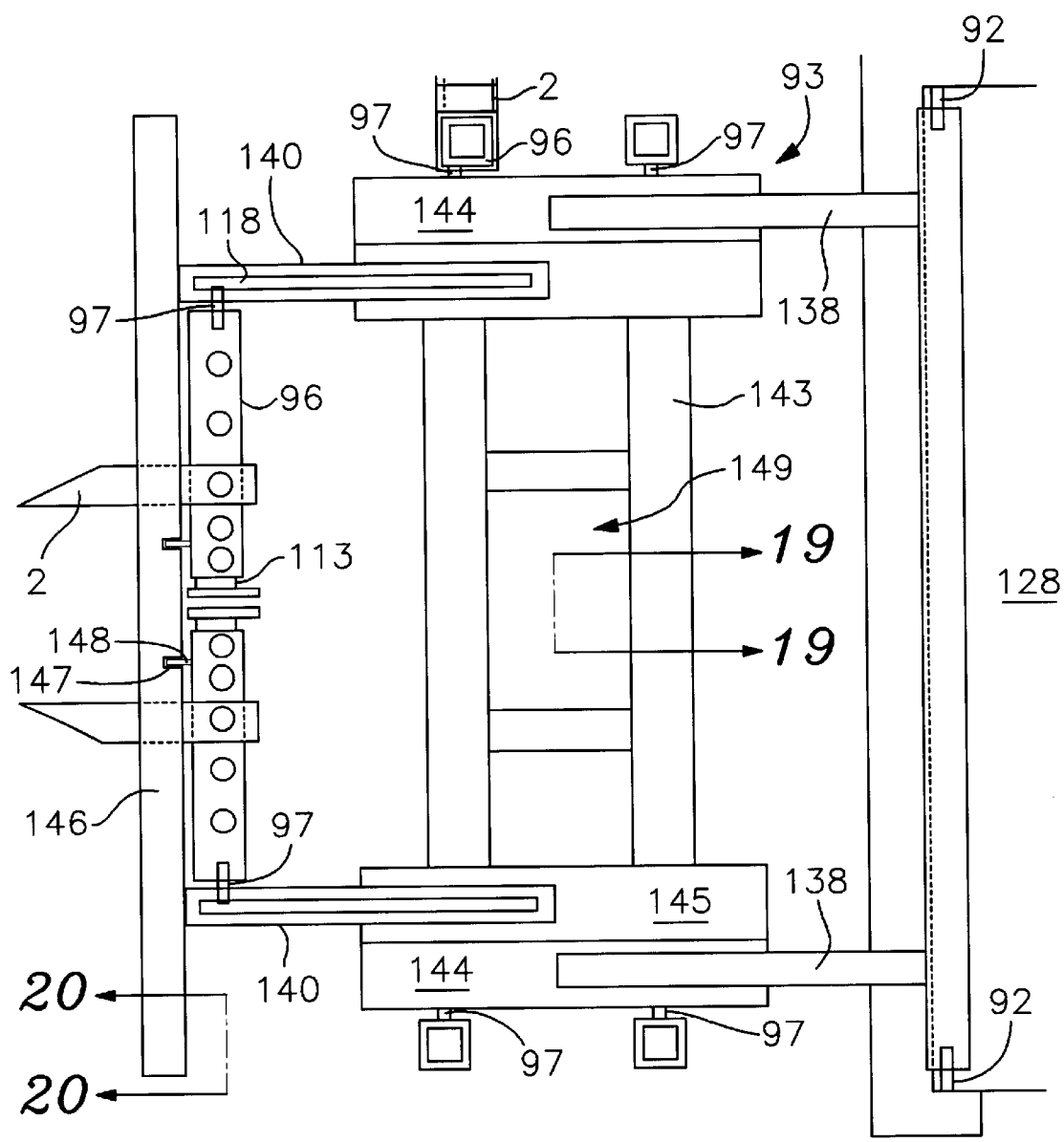
FIG. 13 is a top view of a tailgate which incorporates a saw holder, sawhorses and is extendable.

As is shown in FIG. 13, in the preferred embodiment it is envisioned that the tailgate would be collapsible. In order to get the maximum amount of retraction and opening in the preferred embodiment there is a central frame 139 which holds the saw, removed in this figure, between a left and right arm 142 and 143. This central frame 139 has an outside chamber 144 and an inside chamber 145 which receive, respectively, the attachment extending arm 138 and measuring extending arm 140.

Figure 19:
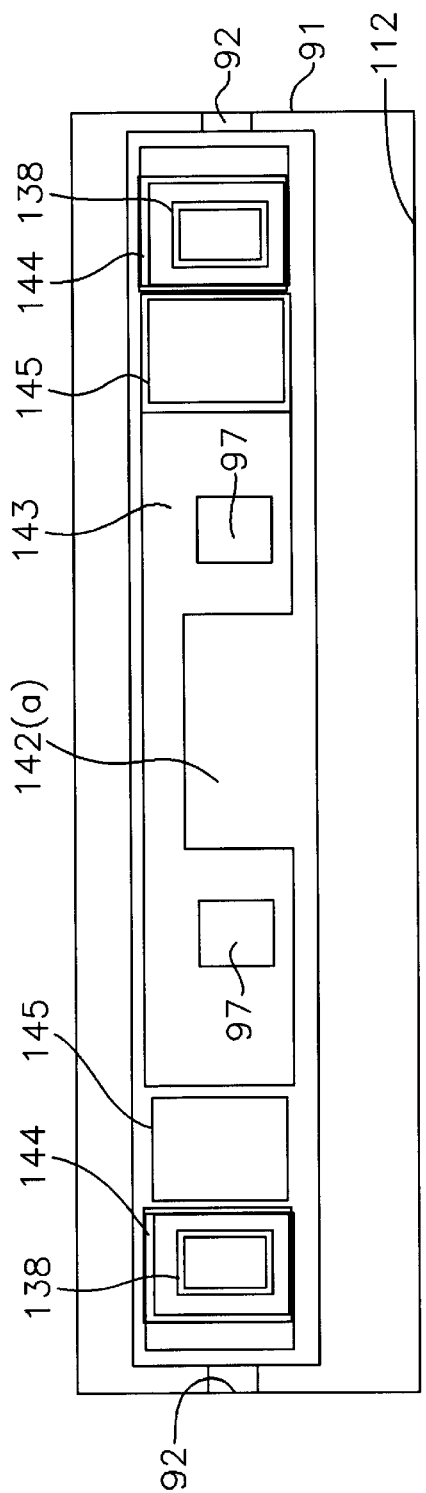
FIG. 19 shows a view through the 19—19 axis of FIG. 13.

As can be seen by reference to the bottom view of one version of this expanding rack shown in FIG. 15, the central frame receives the saw 137 and a holding means for holding the saw, here bolts 110 hold it to the outer frame. The left arm 142 has a gap 142(a) to receive the saw motor. In this way a standard hand saw may be used as long as it may be held in place by the described holding means, or other clips, slides or the like for receiving the saw. This gap 142(a) may also be in the right arm 143 as shown in FIG. 19.

In these embodiments, the plate 99 serves as an aligning means for assuring that the saw is properly aligned with a wood alignment means such as the straight edge rod 116 so that when the saw is in place and aligned the wood can be cut and may be slid along the wood alignment means, rod 116, in order to get a straight cut.

Sawhorses of the type described in more detail below may be incorporated into legs 96 which support the tailgate. In the embodiment shown in FIG. 13, legs 96, with or without brackets 2 are shown at various locations and may be added or removed according the access requirements of the device or they may run from the receiver to a location out of the way, or be mounted to the sides of the truck and not cooperate with the tailgate. By raising one leg relative to another, the table may be leveled.

As can be seen by reference to FIG. 13, the two legs 96 mounted to the measuring extending arm 140 are folded along the pivots 97 so that they are out of the way. The folded legs 96 are secured to the connecting arm 146, by way of pins 148 withing holes 147 in the connecting arm 146. The other legs may also be attached so that they may be similarly folded out of the way. While several legs are shown, it can be seen by reference to FIG. 12 that only one leg 96 is necessary.

Figure 24:
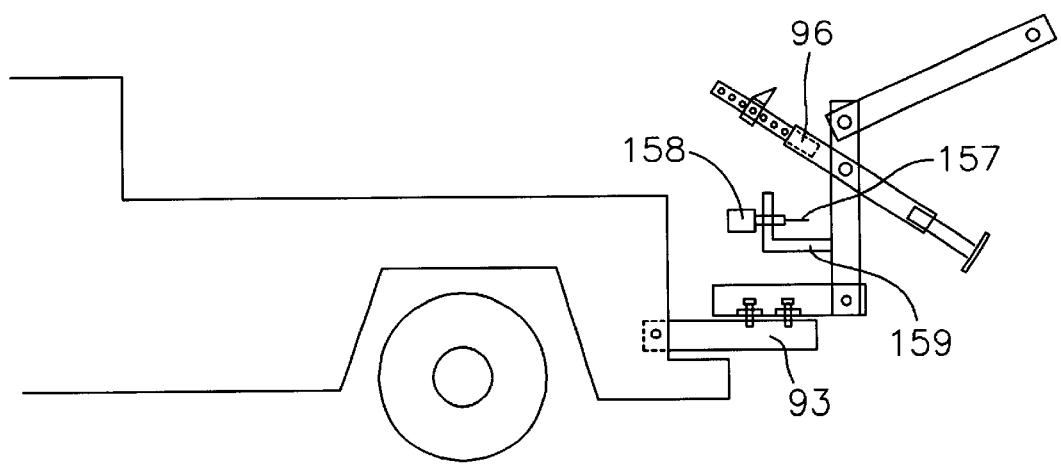
FIG. 24 shows an alternate tool holding means, an arm holding an alternate tool from the embodiment shown in FIG. 14. It also shows the leg held on the central frame so that the arm may move unhindered.

The saw is preferably aligned so that it runs parallel to the wheel base of the vehicle and parallel to the alignment bar 116. While a circular saw is shown in the preferred embodiment and reciprocating saw or other saw means may be held in the space. Similarly a drill may be used.

Where the tool is a drill, as shown in FIG. 24, it may be mounted on an arm 159. Any tool may be slidable on this arm 159. This sliding would be important, as where a saw was mounted on the arm 159 and cut down on the material to be cut on the central frame 141. The saw blade or drill bit 157 in such as case would preferably come down at the central frame opening 149 and the arm 159 and movement along the arm 159 could be restricted so as to prevent the blade from exiting the area defined by the central frame opening. FIG. 24 also shows the leg 96 held on the central frame 141 so that the measuring extending arm 140 may move unhindered out and back from the central frame to align the material to be cut. The slide mechanism may be similar to those known in the art such as are shown in Figures directed to that end in this specification or any other sliding mechanism used for tools known in the prior art.

In addition a saw mounted on a movable arm over the frame may be used where the gate provides an open slot 149 over which the saw may slide in order to cut wood. In such an event, it would be advisable to have a breaking means to prevent the saw from going outside of the open slot 149. Since the open slot 149 could be expanded to any size, the open slot 149 shown in FIG. 13 is for instructional purposes only.

Figure 23:
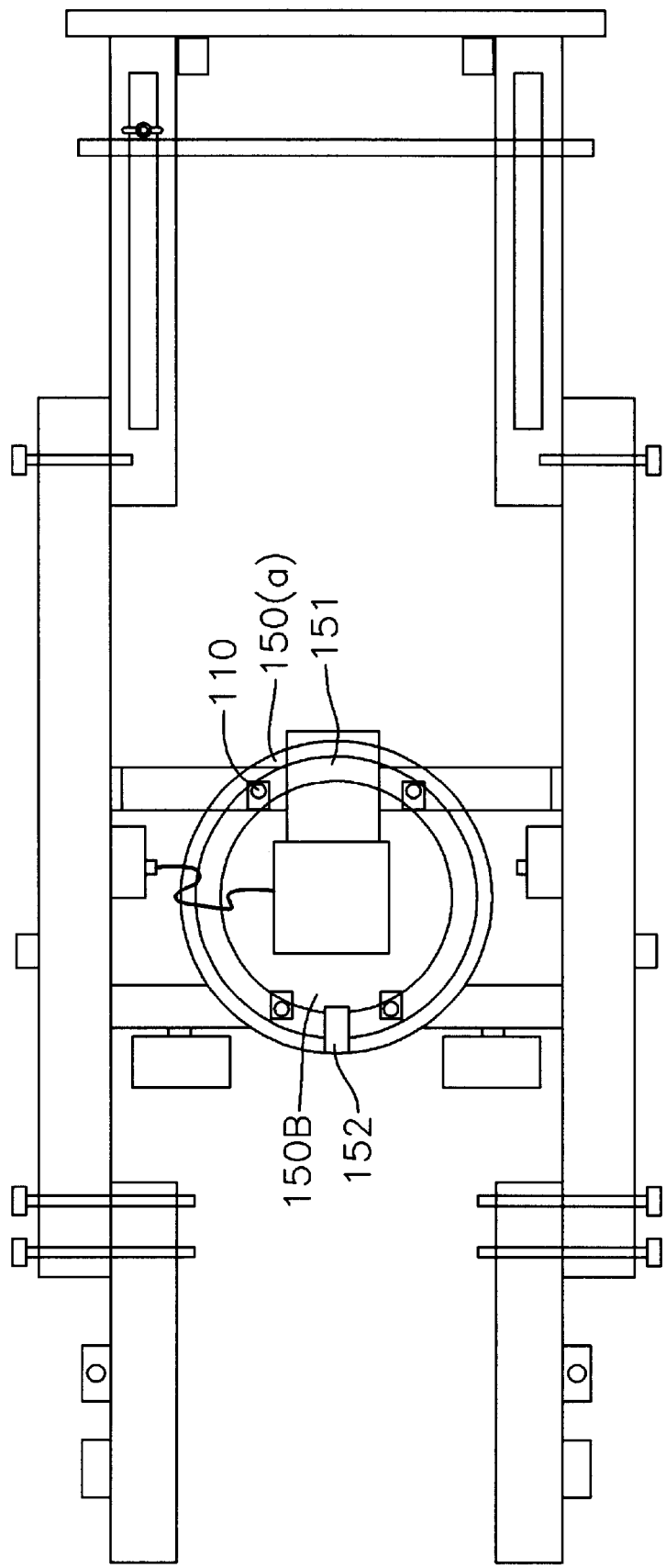
FIG. 23 shows an alternate holding means for holding the tool in place.

While the saw is shown here as being fixed, the blade may be rotatable within the open slot 149 to allow differing cuts to be made. The degrees of offset of the saw may be determined by the simple expedient of having a compass plate 150 at a point of rotation of the saw. The bolts 110 can move around the gap 151 between the outside part 150(a) and inside part 150(b) of the plate 150 as shown in the detail in FIG. 23, thereby allowing the blade to rotate. Alternatively, by changing the position of the left 119 and right 120 guides, the same result can be possible.

The three members are preferably designed so that when fully collapsed it is approximately the same height and the height of a tailgate for the vehicle although it might be slightly larger or slightly smaller. It is also preferable that the two attachment extending arms 138 rest against the bumper 112 when the tailgate is extended for use as a saw.

Figure 14:
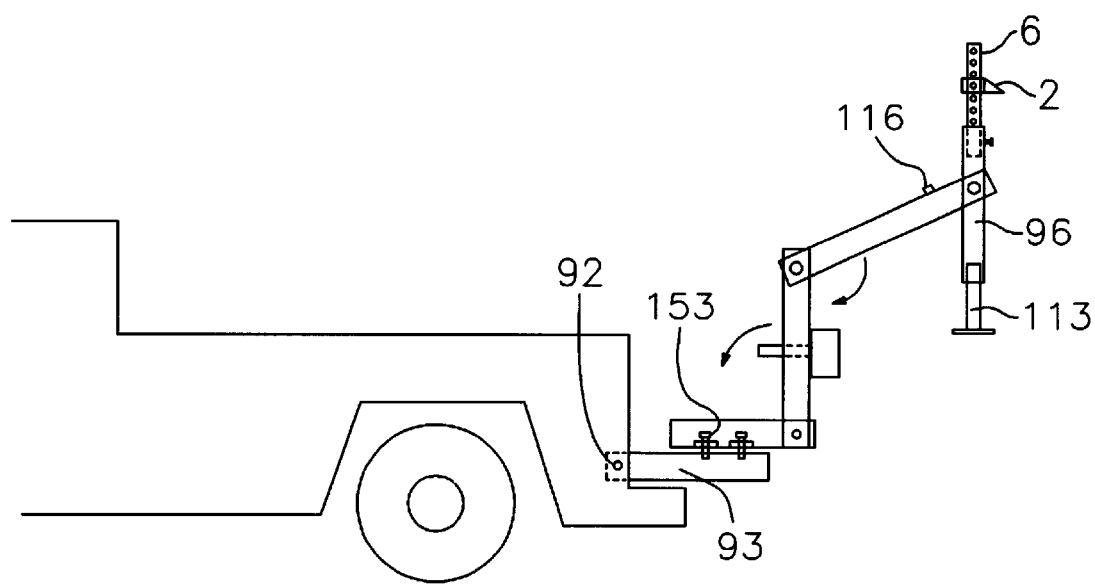
FIG. 14 is an alternate embodiment of the tailgate shown in FIG. 13 which folds onto an existing tailgate.

FIG. 14 shows an alternative embodiment which is bolted, by tailgate bolts 153, to the tailgate 93. This embodiment allows that this version may be attached to any existing vehicle tailgate. This version may fold down flat as shown by the arrows on FIG. 14 and the fold out flat, as shown in FIG. 15 when not in use. The sawhorse legs 96 in this version have a rising arm 6 on which the bracket 2 is secured, as discussed in more detail below, to allow the height of the sawhorses go be raised.

FIG. 15 shows the bottom of the extended saw table shown in FIG. 15. This shown a fixed holding mechanism using bolts 110 to secure the saw in place. It also shows the bolt holes 153(a) where the bolts 153 are inserted to secure the device to a tailgate, not shown.

Figure 16:
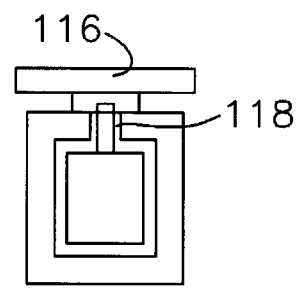
FIG. 16 is a detail view of the slide mechanism shown in FIG. 15.

FIG. 16 shows a detail through 16—16 of FIG. 15 for one of the measuring extending arms 140. It can be seen here that the rod 116 may be directly mounted onto guide slots within the extending arms 140, extending outside of the guide slot 118. It is possible to fix the location of the rod 116 relative to the measuring extending arms 140. If this were done, the entire arm 140 would have to move to change the measurement and measurements on the rod could reflect this.

Figure 17:
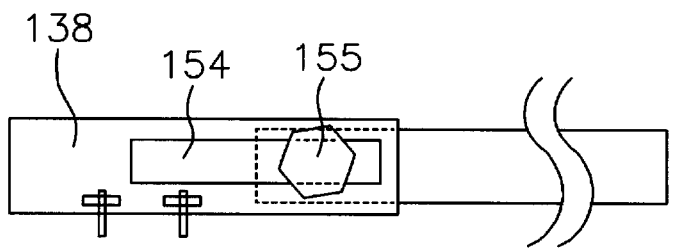
FIG. 17 shows a detail of an alternate securing mechanism which would allow the saw table shown to slide out.

FIG. 17 shows an alternative slotting arrangement. Here, a slot 154 is provided on the side of the attachment extending arm 138 so that the central frame 139 may slide out of the arm 138 and be secured by bolt 155.

FIG. 18 shows a version of the invention shown in FIG. 14, except that the tailgate is replaced with or serves as the attachment extending arm 138.

FIG. 19 is a cross sectional view through 19—19 in FIG. 13.

Figure 20:
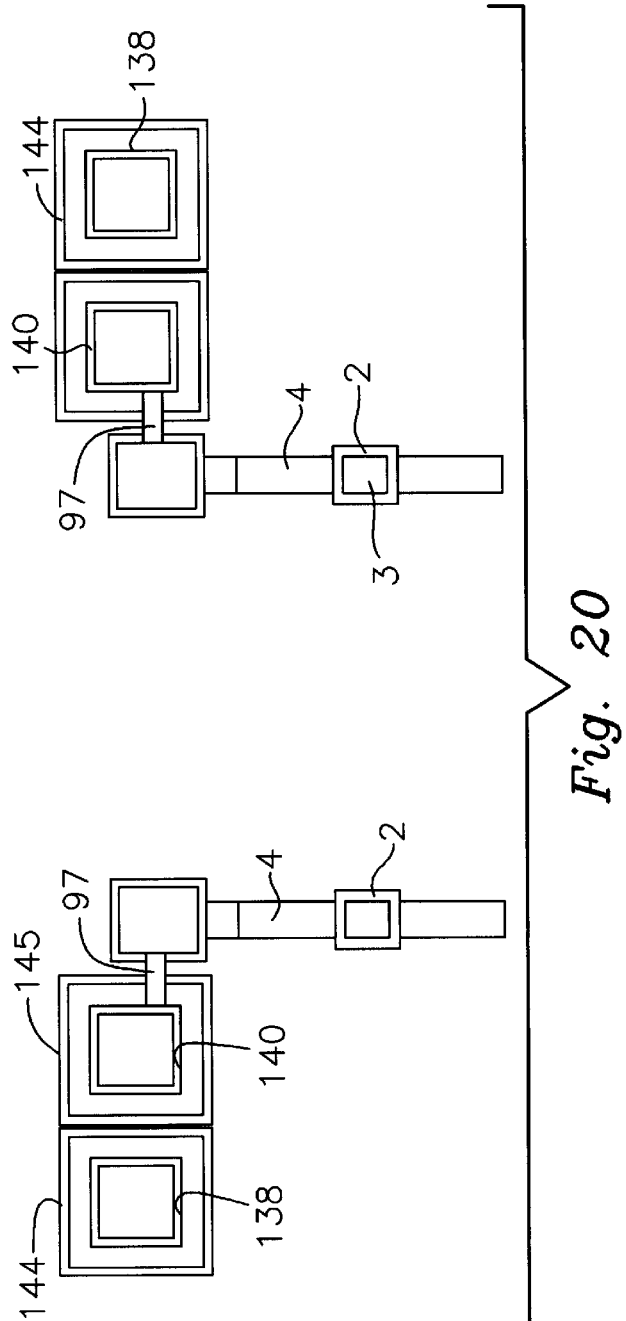
FIG. 20 shows a view through the 20—20 axis of FIG. 13.

FIG. 20 is a cross sectional view through 20—20 in FIG. 13 with the legs lowered.

Figure 21:
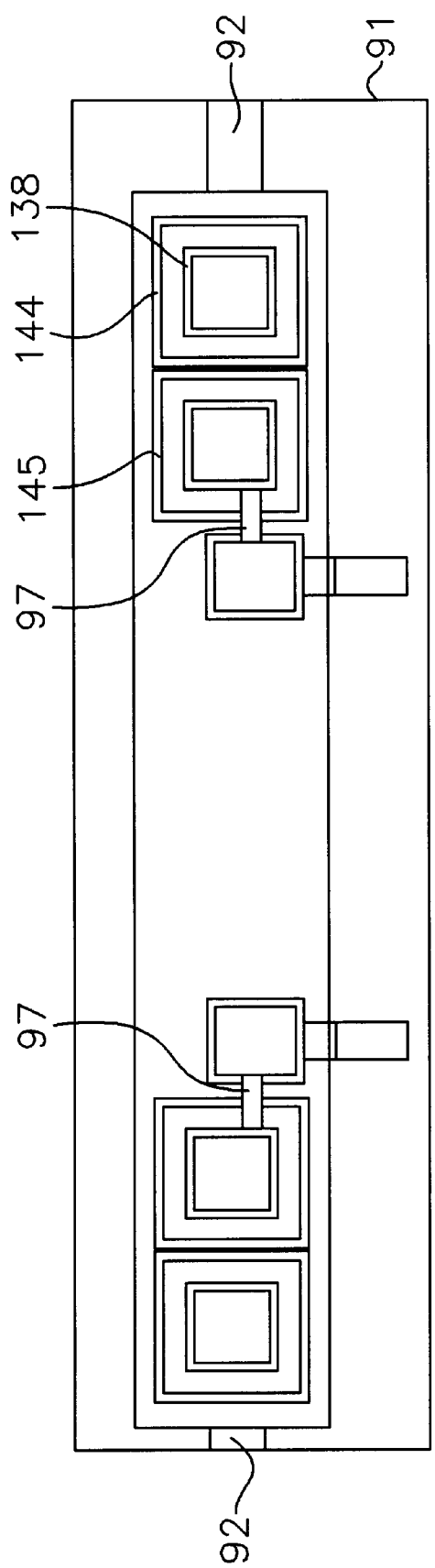
FIG. 21 shows a view through the 20—20 axis of FIG. 13 with the sawhorses lowered.

FIG. 21 is a cross sectional view through 21—21 in FIG. 13 with the legs raised.

Figure 22:
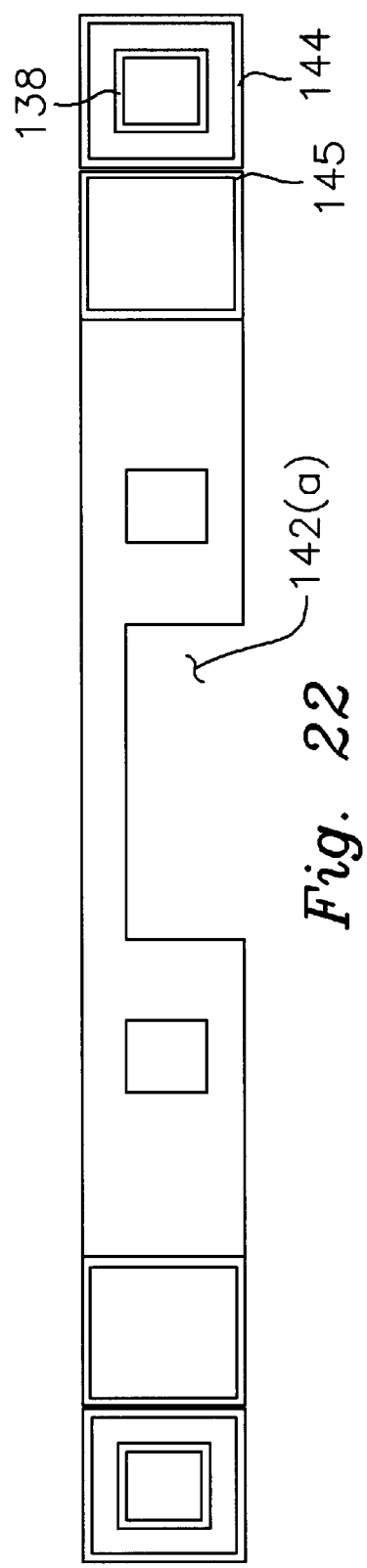
FIG. 22 shows a view through the 22—22 axis of FIG. 13.

FIG. 22 is a cross sectional view through 22—22 in FIG. 13.

In one embodiment, there is a rack folded into the tailgate which would drop so that one part was parallel to the bumper. The second part would drop down past the bumper and perpendicular to the bumper to the ground, and a third part, which would be adjustable in height, would be the bracket, which could be raised and lowered relative to the part went to the ground from the tailgate. Each of the parts coming off of the tailgate could be made in such a way that they folded within the other part and dropped out in a hinge-type mechanism.

If there was a rack of sufficient strength, this saw table arrangement could come off of the side or a frame on the front of a vehicle. Vehicles having front frames of sufficient strength to support this saw table arrangement are known in the art. The saw table is preferably the same size as the vehicle tailgate when folded and unfolds to be large enough to support standard lengths of lumber.

Figure 9:
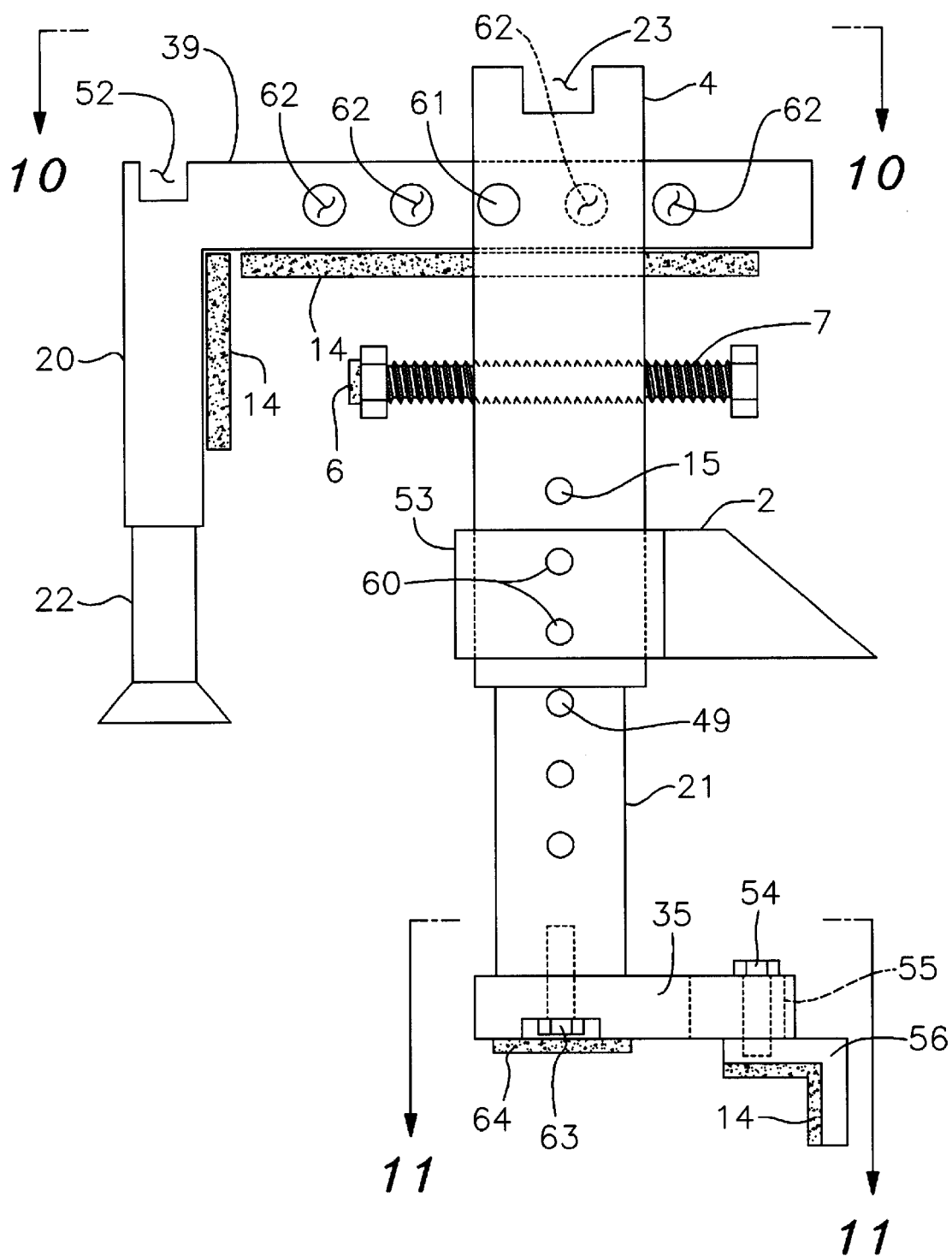
FIG. 9 shows a modification to receiving scaffolding present on the embodiment shown in FIG. 1.

As can best be seen by reference to FIG. 9, the sawhorse portion of the invention comprises a bracket means for holding a cutting surface wherein the cutting surface 1 is preferably a two by four and wherein the bracket means is preferably a bracket 2 held by a support means, here two legs, a first primary leg 4 and a secondary leg 20. These are connected by a top leg 39. In the embodiment shown in FIG. 9, each of the two bracket means comprises a primary leg 4, a secondary leg 20 and a top leg 39 which here, is a welded integral part of the secondary leg 20. Pads 14 may be provided to ease the contact between the legs and the vehicle tailgate (shown in FIG. 1).

Figure 10:
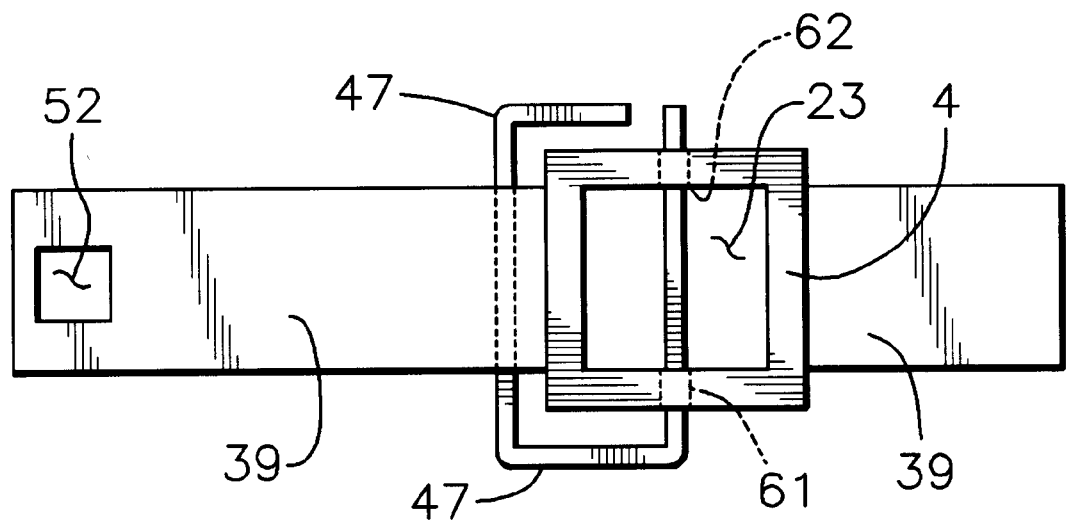
FIG. 10 is a detail view from the top of FIG. 9.

The primary leg 4 has primary leg holes 18 capable of receiving a straight or locking pin 47. An example of a locking pin is shown in FIG. 10. A primary leg extension 21 allows for the length of the primary leg 4 to be extended. The primary leg extension 21 fits within the primary leg 4 and has holes 49 which may also receive a locking pin 47 to fit the length of the extension 21. A base plate 35 has a L-clamp 56 attached to the base plate 35 which can hold the device to a vehicle bumper 9. The base plate 35 is secured to the primary leg extension 21 by a countersunk bolt 63 and may have a pad 64 over the base plate 35 to even out the height relative to the L-clamp 56.

A bolt 7 is used to vary the angle at which the primary leg 4 sits against the vehicle by moving the primary leg 4 away from the tailgate 11 as the bolt 7 is moved towards the tailgate 11. The primary leg 4 is threaded so that the bolt 7 may turn through the threading to push against the tailgate 11. At the end of bolt 7 is a pad 6 which serves to cushion the bolt 7 as it presses against the tailgate 11. A locking pin 47 (which may be replaced with a bolt as shown in FIG. 1) fits though the hole 60 in the c-clamp 53 which fits around the primary leg 4 and is secured to the bracket 2. The hole 18 is lined up with a primary leg hole 48 at the desired height. It could also attach to the secondary leg in other embodiments. A second lower pin 47 (or the same locking pin 47) is used to fix the position of the primary leg extension 21 by passing though one of the extension holes 49 and primary leg holes 18 in this embodiment.

Figure 11:
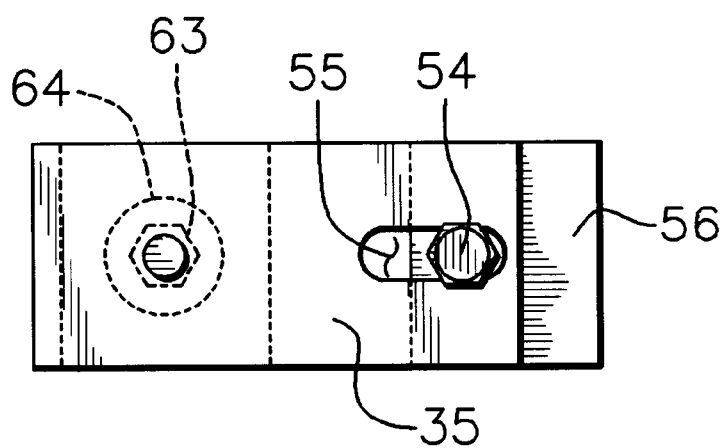
FIG. 11 is a detail view of the foot shown in FIG. 9.

At the termination point of the extension is a base plate 35. As shown in FIG. 11, the base plate 35 defines a slot 55 which serves to receive a bolt 54 which moves within the slot 55 to position L-clamp 56 which secures of the primary leg to the bumper. The base plate may turn about pin 63 in either direction to secure from the front or rear of the bumper.

This shape allows the primary leg 4 to rest on the bumper 9 of the truck to which it is mounted. Secondary leg 20 lies on the opposite side of the truck tailgate 11 from the primary leg 4. Top leg 39 fits over the top of the tailgate 11 and through a hole in primary leg 4 to tighten the primary leg 4 and secondary leg 20 against the tailgate 1I as shown in FIG. 10. Secondary leg 20 need only be long enough to provide a surface to support the cane shaped structure thereby defined. Front scaffold hole 23 and rear scaffold hole 52 may be provided to receive scaffolding (shown as 24 in FIG. 1) as described in more detail in reference to FIG. 2.

The attached drawings show several different embodiments of the invention. In all cases it is envisioned that two separate cutting surfaces 1, preferably two by fours, will be held approximately parallel so that the combination forms a sawhorse type arrangement.

In its broadest embodiment, the invention is nothing more than a bracket 2 for holding a cutting surface 1 to an attachment surface, in the shown embodiments, a tailgate 11. It can easily be seen that the sawhorse in the various embodiments shown could mount to different locations on a vehicle, the main invention set out herein. However, by describing the specific structure (FIG. 8 and 9), it can be seen that this specific type of bracket may fit over boards parallel to the ground and held up by nails into the frame at a house being framed. This would be desirable where, for example, it was desired to build a roof over a frame or to have a sawhorse within a frame. To accomplish this, a board is nailed parallel to the ground on studs of the frame and then the sawhorses described herein are put onto the board, just as if a tailgate was being used.

The attachment means for holding the bracket 2 is described herein in several different embodiments. In FIG. 9 it is a c-clamp 53 fitting around a primary leg 4 where the c-clamp 53 is attached to the bracket 2 by a joining weld.

Figure 8:
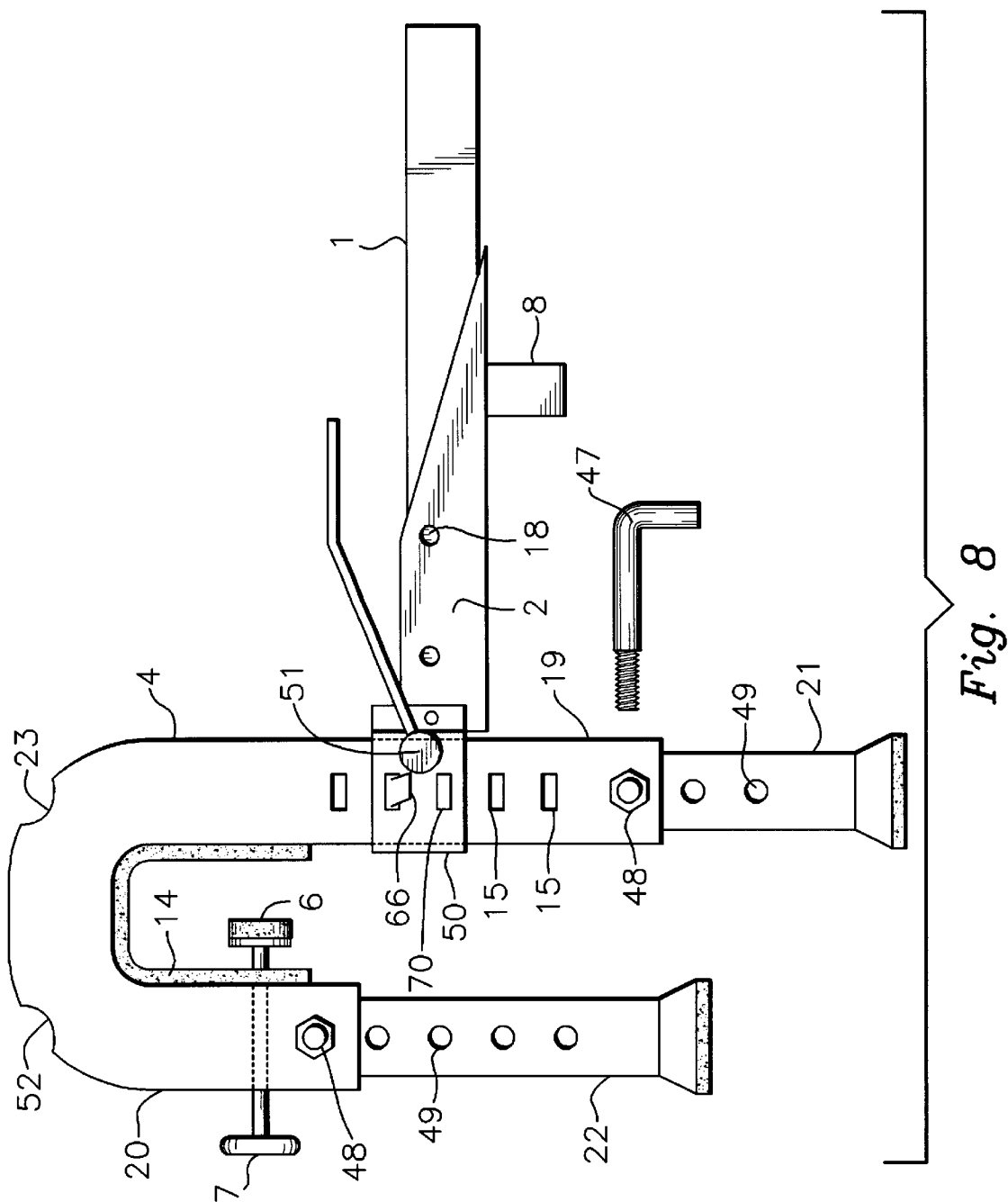
FIG. 8 shows a modification to receiving scaffolding of the embodiment in FIG. 1.

In FIG. 8, the c-clamp is replaced with a jack 50, such as that which is found on standard automobile jack. With a jack, the height of the bracket may be adjusted or the height of the bracket 2 adjusted even when fully loaded by using a leveraged arm 51. Here, a bolt 47 fits through a nut 48 to secure the position of the secondary leg 21 relative to the primary leg 4. The slots 15 shown in the primary leg 1 are engaged by jack 50.

Also, FIG. 8 shows an embodiment where the primary, top and secondary legs are a single unit. This would be preferred where only a single sized tailgate was used. Here, the adjusting bolt 7 with pad 6 is on the secondary leg as opposed to the primary leg. Padding 14 is also used in this embodiment.

The jack 50 might be replaced with other adjusting mechanisms. One example would be to have an adjusting bolt within the primary leg 4 which is rotated by a handle outside of the primary leg. The length of adjusting bolt would rotate and would run parallel and within the primary leg length. In this way, the bracket could be mounted to an adjusting nut which was fitted onto this adjusting bolt. A the bolt was turned, the height of the bracket would vary as the nut holding the bracket moved up and down the bolt.

As can be seen, the bracket defines holes 18 through which a nail or screw may be driven to secure the cutting surface 1. The attachment surface shown in FIG. 1 is the tailgate 11 of a truck. Any similar surface would provide for a different embodiment, but is considered herein. For example, using a board nailed to a frame providing a similar surface for attaching the primary, top and secondary legs.

Figure 7:
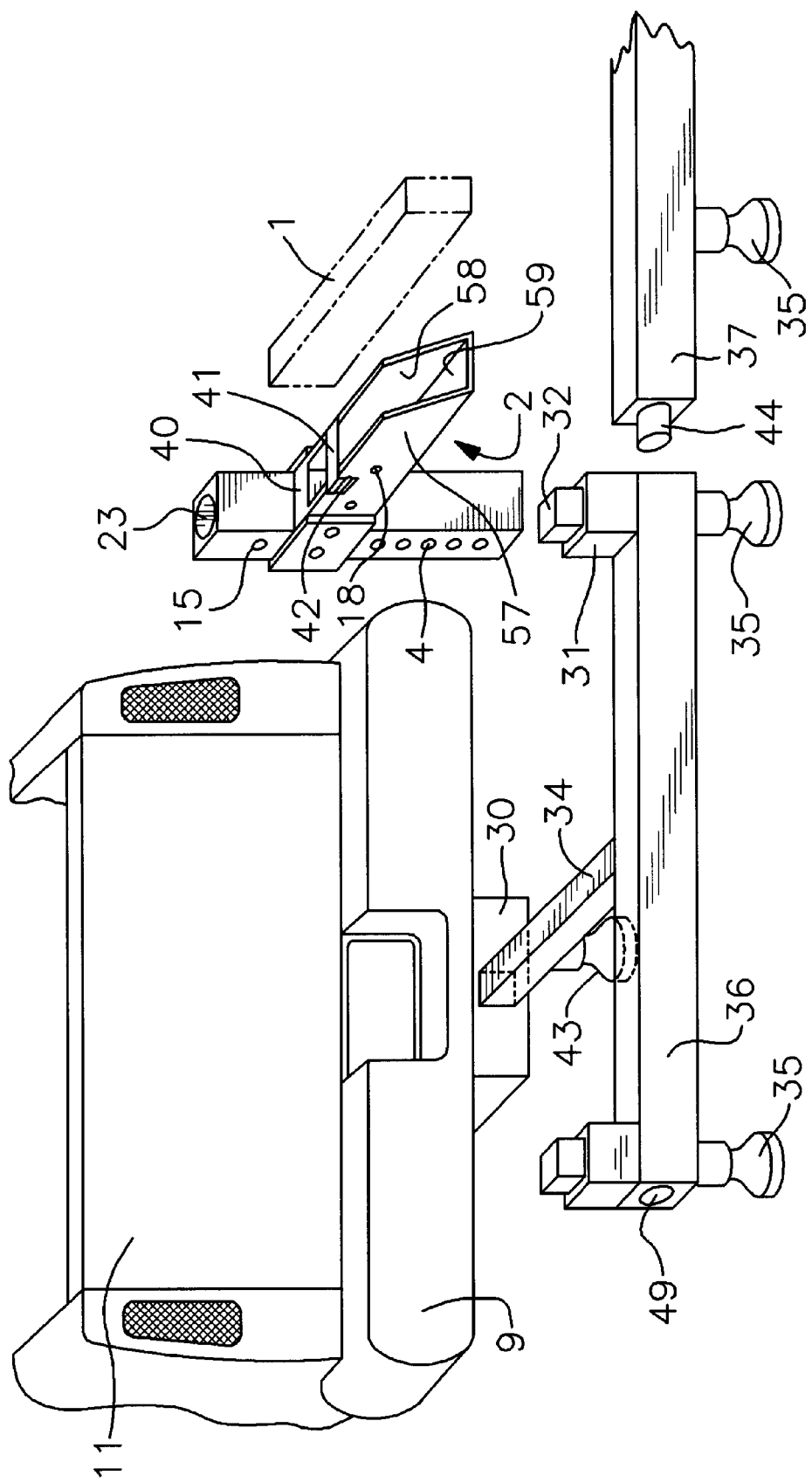
FIG. 7 is an alternate embodiment showing the receiver hitch used as a mounting surface.

FIG. 7 shows the use of a receiver hitch 30 for receiving a receiver hitch beam 34 which in turn holds t-bar 36. Support beams 31 extends upward from the t-bar 36, supported from the ground on one or more base plates 35. The primary leg 4 then is attached to this support beam 31. Extension beams 37 supported by base plates 35 may be provided to lengthen the sawhorse spread between two or more primary legs 4. The extensions have extension pegs 44 which may fit into extension holes 49 to extend the length and add primary legs 4 and their corresponding brackets 2. As can be seen in FIG. 7, the bracket 2 has a top 40, a left side 57, right side 58 and bottom 59. The forward top portion of the left side 57 and right side 58 slant down toward the bottom 59 so that progressively more of the cutting surface 1 is exposed.

The bracket 2 has one or more holes 18 into which a bolt may be inserted to hold the board or other cutting surface 1 in place within the bracket 2. A hinged top 41 is also shown which would be an alternative or addition to the top member 40.

In all of the embodiments, it is envisioned that there would be two brackets 2, having longitudinal lengths which are parallel to one another, and separated by a distance of at least two feet (60 centimeters) so as to hold two boards out from the attachment surface tailgate 11 so that the two boards 1 function essentially like a saw horse. However, this distance, between cutting surfaces (boards) 1 could vary from no more than 6 inches (15 centimeters) outward.

Figure 3:
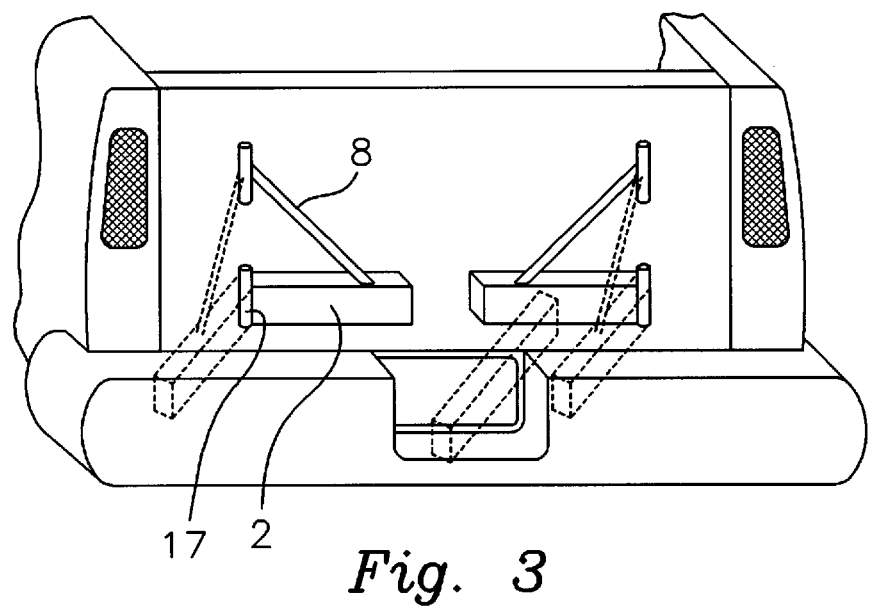
FIG. 3 is an alternate embodiment showing the saw horse built into the tailgate of a vehicle.
Figure 4:
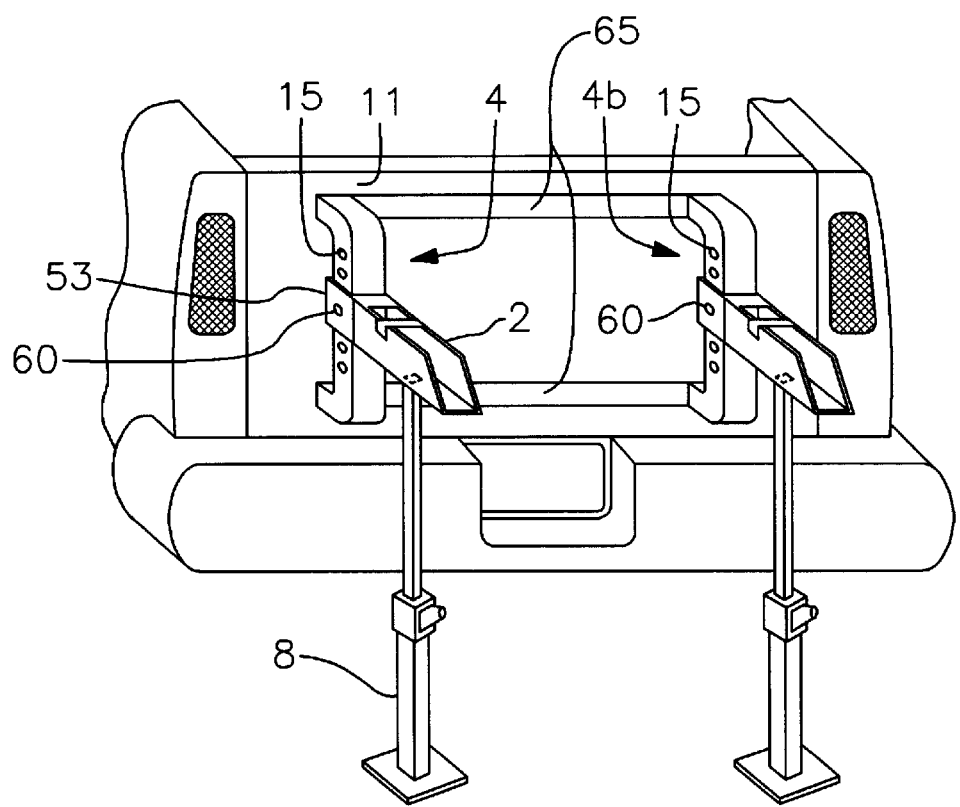
FIG. 4 is an alternate embodiment of the embodiment shown in FIG. 3.
Figure 6:
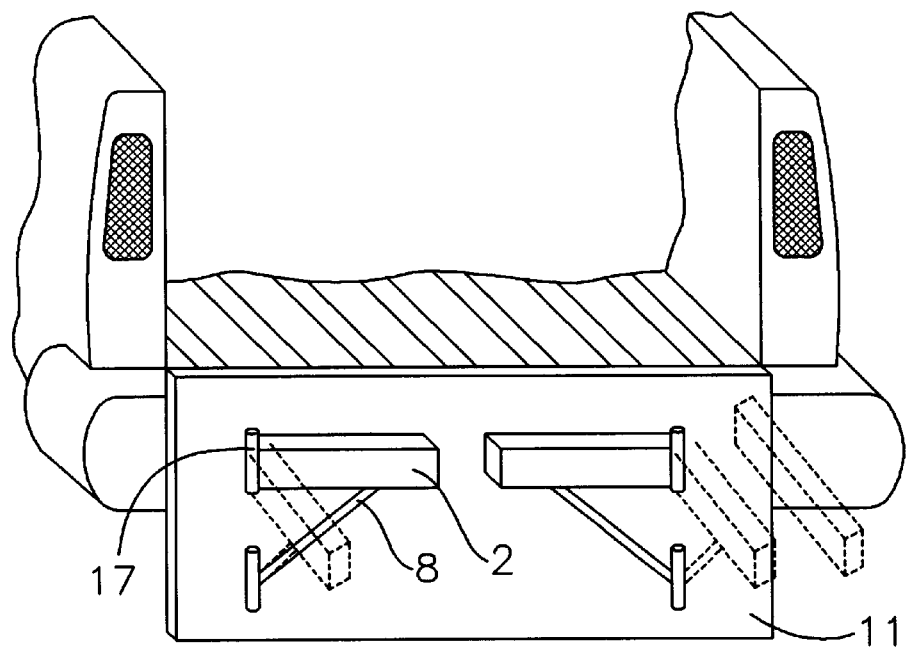
FIG. 6 is a third alternate embodiment of the embodiment shown in FIG. 3.

FIG. 1 shows one embodiment of the invention. The invention may described as a mounting means, here a primary support 4 which holds a bracket 2, here in the form of a length of channel iron having a longitudinal length. The channel iron bracket 2 defines a slot 3 into which a two-by-four or similar cutting surface 1 may be inserted. The channel iron is mounted on a cane-shaped support (like shown in FIG. 8) having a primary leg 4, a top leg 39 and a secondary leg 20 which here are molded together in a single cane-shaped support. The bracket 2 has a brace arm 8 which may rest on the bumper 9 of the pick up truck or against the support 4 or against the ground. The mounting of the bracket 2 to the support 4 may be by a weld or by a hinge so that it may swivel out as shown in FIGS. 3, 4 and 6. When a swivel is used, the support needs to swivel out at least 90 degrees in the preferred embodiment from the plan formed by the face of the tailgate 11.

While in FIG. 1 the secondary leg 20 merely hooks over the tailgate the secondary leg 20 may be long enough in order to reach the flat bed of the truck. As shown in FIG. 8, this could be done with a secondary leg extension 22.

The brace arm 8 may be made adjustable in length, so that it may brace the bracket 2. This brace arm may run from the bracket 2 to the primary leg 4 (as shown in FIG. 1), or it may run to the bumper 9, or it may run more or less straight down to the ground (as shown in FIG. 4), to support the rear of the bracket 2 against the ground. In FIG. 4, this brace arm 8 is shown going to the ground. It may also rest on a wheel to allow the sawhorse to move with the truck.

This brace arm 8 may either be fixed or may be hinged at the point of attachment to the bracket 2 as shown in FIG. 3 and FIG. 6. It may attached to one or alternatively at all three locations set forth above.

Since the beam 2 is desirable as a steady surface, some mechanism could be provided in order to hold the support 4 in place and to adjust the angle of this relative to the ground. Several alternatives are present for this.

The simplest, would be to have a bolt 7 push a pad 6 against the tailgate of the truck to which the device is mounted as shown in FIG. 8 or to use the brace arm 8 to vary the angle.

To properly fit the support 4 to the tailgate the shape of the support may correspond more closely to the surface over which it fits, so that it tightly fits in place, either with or without a padding to enhance the fit. Also, the entire support top may be hinged so that the distance between the primary legs to the secondary legs can be tightened in order to draw the primary leg to the secondary leg, sandwiching the truck bed between the two (as shown in FIG. 9). Similarly the bracket 2 could be attached by way of hinges 17 allowing the angle between the tailgate and the bracket to change. To prevent undue damage to the truck in either embodiment, an inner pad 14 is envisioned to cushion places where the support 4 comes in contact with the truck and where the primary leg or secondary leg comes in contact with the truck or the bumper.

The invention is to be used as a saw horse. The brackets themselves must be made of a material which can be cut or they must provide a slot 3 or the equivalent of the slot 3, in order to mount a cuttable block 1 which is preferably a two-by-four or four-by-four, depending on the size of the sawhorse desired. The slot shown in FIG. 7 has a top 40, a left 57 and right 58 side and a bottom 59 which define the slot 3 into which the cutting surface 1 may fit. A hinged top 41 is an optional part to better secure the cutting surface 1.

In the preferred embodiment, the slot 3 allows for an enclosed portion of a two-by-four cutting surface 1 of sufficient length to be slid within the slot 3. The remainder of the two-by-four extends out of the slot 3. The two-by-four may be tightened in place utilizing a screw-type mechanism so that the boards do not slip out of the grooves. Alternatively, the slots can have sufficiently small tolerances, so that the boards (cutting surface 1) are held tightly, or the boards may be held more loosely in these slots 3. As shown in FIG. 7, one or more holes 18 in the bracket 2 may be present in order to allow for the board to be secured by way of a screw or nail or bolt which fits through the holes 18 into or onto the board 1. FIG. 1 shows a slot which is only enclosed on three sides. As can be seen, these slots are to hold boards which are less than ten inches (25.4 cm) across, although they are preferably six inches (15.24 cm) or less and greater than one inch (2.54 cm).

As shown in FIG. 2, top band 12 and bottom band 13 may both be put in place in order to hold the a first primary leg 4 and a second primary leg 4a in place and to fix the distance from one bracket 2 to the next bracket 2a. While these supports are shown on the primary legs, they may also be mounted to the top leg 39 or to the brackets 2 and 2a.

These bands 12 and 13, may also allow for the length between them to be adjusted.

As shown in FIG. 2 a board 10 may be placed over the beams, once in place, in order to provide a table surface on which to work. In addition, the support 4 may define a scaffold hole 23 at the top into which a scaffold leg 24 may be inserted. The scaffolding provided may support a shade 26 so that the work done is done out of direct sunlight. The combination of the cutting surface 1 and board 10 may be replaced with a table saw or drill or similar device. While this would be a significant departure from the inventive concept embodied herein, it is a possible use of the bracket system herein described.

As shown in FIG. 8, leg 4 or 20 may have an adjustable extension 21 and 22 respectively, in order to allow a single device to be mounted on trucks having tailgates of various sizes. This extension may be, as in the preferred embodiment, a leg of variable length, mounted to the bottom of either primary leg 19 or secondary leg 20.

The primary leg 4 defines a height adjustment means for varying the height of the bracket. In the preferred embodiment this adjustment means comprises a series of holes. The bracket 2 is held in place in the embodiment shown in FIG. 1 with a bolt 17. However, any height adjustment means such as a screw, hydraulic jack, mechanical jack or the like may be substituted. In one concept the bracket could be mounted to a nut which traveled on a threaded bolt which could rotate within the primary support. As the nut travels up and down this bolt, the position of the bracket changes.

There are a number of alternate methods of mounting the beam to the primary leg which would include a permanent welding of the beam in place, the placement of the beam along the set of tracks (such as those used in shelving or specialized tracks for this particular use). Similarly, it could be secured at two or more points by three or more bolts 17 or the equivalent thereof.

Alternatively, once the height was determined for a particular set or a particular vehicle, it could then be either welded in place or even glued in place with the proper technology.

Similarly, there could be a groove defined along the length of the primary leg 19 and a securing mechanism would provide that the bolt could slide within that groove, and then be wide enough or have a washer which was wide enough to prevent it from moving completely out of the slots which would provide for a greater degree of adjustment as shown for the base plate 35 in FIG. 11.

Where an embodiment such as that shown in FIGS. 3–6 is used, it would be preferable to have the height of the pivot 28 changeable along the truck tailgate as by having rails (FIG. 5) serving as primary supports 4 along which pivots or brackets move on c-clamps 53 fitting around the rail type primary supports 4.

Once two of the supports and brackets are in place, and boards are placed within the slots in the beams and a saw horse or work surface is provided. As described in the invention, it can be seen that although these beams could be uneven; in the preferred embodiment, they would be at the same level so as to provide an approximately flat cutting surface.

A level could be utilized in order to assure that they provided a flat surface or where the ground where the user stood was uneven, the height could be adjusted in order to provide a surface consistent with the perspective of the user. The distance from the ground should vary in order to provide an acceptable height from which to work.

The cutting surface of the cuttable member, which is preferably a two by four wooden board has a top surface having a width between one inch (2.54 cm) and ten inches (25.4 cm). The angle means for adjusting the angle of the cutting surface top surface from the ground can be a bracket leg attached to from bracket to surface of vehicle or can be the primary leg separator further comprises an adjustable primary leg separator attached near the top position of the primary leg for adjusting the distance at which the primary leg is held out from the attachment surface or can be accomplished as a combination of both. Truck bed 70 is shown in FIG. 6.

Figure 5:
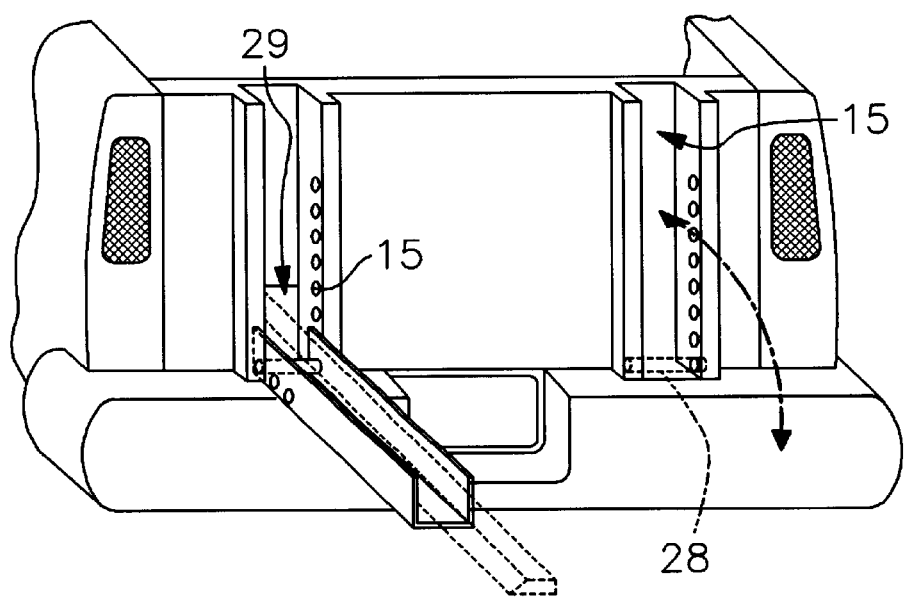
FIG. 5 is a second alternate embodiment of the embodiment shown in FIG. 3.

FIGS. 3, 4, 5 and 6 show methods of modifying the tailgate itself to act as the support 4 for the bracket 2 and brace 8. As shown in FIG. 5, the tailgate itself may provide recesses 15 into which the bracket 2 fit when not in use. As shown in FIG. 5, the brackets may be mounted on pivots 28 adjustable on support holes is so that they may swing out into place to receive a cutting surface 1, here a board.

A tailgate opening 29 is shown through which the board 1 can slide onto the truck bed and the truck bed and tailgate opening 29 function as a bracket. As shown in FIG. 4, the brace 8 may be located below the bracket 2 and run to the ground so as not to interfere with the cutting area.

In FIG. 4 the brackets 2 mounted on c-clamps 53 slide over primary supports 4 and 46, fitted through holes 15 and 60. The primary supports 4 and 46 slide within rails 65 built into the tailgate 11. FIG. 5 shows where the brace may drop down vertically so that the bumper 9 provides the brace 8 for the bracket 2. FIG. 5 shows holes 18 to secure the cutting surface 1 in the bracket slot 3. In addition, there is a tailgate opening 29 through the tail gate 11 which allows the cutting surface 1 to be moved in and out of the trailer bed when the bracket 2 is lowered. This tailgate opening 29 may also hold a portion of the cutting surface 1 so that it does not fall downward when pushed down at the far end from the bracket 2. When the bracket 2 is folded into the tail gate 11, the tailgate openings 29 are shut off.

While the invention is primarily designed for use with a vehicle having a tailgate 11, it can be seen that the attachment surface shown as the tailgate 11 could easily be the side panel or front panel of the vehicle.

In order to lower the level of the cutting surface further, FIG. 6 shows how a tail gate may have the cutting surface on the inside face. In this embodiment, the tail gate would have to be constructed so as to fold down below the bumper. This could be done by modifying the construction of the bumper or by adding a second tailgate containing the invention behind the primary tailgate so that this mechanism would function properly.

Yet another example of how this may be practiced, shown in FIG. 7 allows for the bracket means to be mounted onto the receiver hitch 30. Here the bracket is brought out onto an extended system supports holding primary supports for larger projects using the vehicle as a ready anchor. A similar hitch mounted to the front of the vehicle could also be used. In FIG. 7, the tailgate is not affected. Instead the bracket 2 is mounted by way of the receiver hitch 30 below the bumper. The primary support 4 is mounted on a support beam 31 by way of a joining means which here comprises a hole 33 in the bottom of the support 4 into which a post 32 in the support beam 31 is inserted. The support beam 31 has a support foot 35 much like the brace arm 8. The support beam is attached to a receiver hitch beam 34 by way of a t-bar 36. This provides for greater spacing between the two brackets 2. The length of the t bar, and the ability to provide for more brackets 2 is provided by having extension beams 37 which may have beam posts 39 which may be inserted into beam holes 38 in the t bar 36 or in other extension beams to form a matrix of support beams and corresponding brackets 2. Since these support beams 21 may have scaffolding holes 23, a matrix for scaffolding is also provided.

As shown in FIG. 7, the bracket is modified so as to have a top portion which may be sealed at the rear with a roof 40, or a hinge 41 holding a cap 42 over the top of the rear portion of the slot 3 in bracket 2 so as to better secure the cutting surface 1.

There is a receiver hitch beam foot 43 which can be used to keep the sawhorse brackets 2 in place after the vehicle is used. There may also be extension feet 44 to support the extensions 37 which may be used to extend the length of the t-bar 36. The t-bar 36 as shown runs in either direction from the receiver hitch beam 34. It is obvious, however, that it may run in only one direction from the receiver hitch, either left, right or back. The only requirement is that either the receiver hitch beam 34 itself or the t-bar 36 hold at least two supports 4 so that a saw horse arrangement is possible.

FIG. 8 shows a close up of an alternative support/bracket arrangement shown in FIG. 1. In FIG. 8, at various locations, the holes 15 are rectangular and corresponding latches 66 are attached to the side (although they could be on the back or bottom) of the bracket 2 so that the beam latches 66 use the side of the brackets 2 and the weight of the brackets 2 to hold the bracket latched in place. Traditional carjacks function in this same fashion. Any jack-type arrangement, such as a hydraulic jack or a car-type jack could be utilized in order to raise and lower the height of the beam 2 so as to provide greater adjustment and to allow the level of the beams to be moved without effort when loaded. A bolt 47 through a nut 48 in the primary allows the cutting surface 1 to be moved in and out of the trailer bed when the bracket 2 is lowered. This tailgate opening 29 may also hold a portion of the cutting surface 1 so that it does not fall downward when pushed down at the far end from the bracket 2. When the bracket 2 is folded into the tail gate 11, the tailgate openings 29 are shut off While the invention is primarily designed for use with a vehicle having a tailgate 11, it can be seen that the attachment surface shown as the tailgate 11 could easily be the side panel or front panel of the vehicle.

In order to lower the level of the cutting surface further, FIG. 6 shows how a tail gate may have the cutting surface on the inside face. In this embodiment, the tail gate would have to be constructed so as to fold down below the bumper. This could be done by modifying the construction of the bumper or by adding a second tailgate containing the invention behind the primary tailgate so that this mechanism would function properly.

Yet another example of how this may be practiced, shown in FIG. 7 allows for the bracket means to be mounted onto the receiver hitch 30. Here the bracket is brought out onto an extended system supports holding primary supports for larger projects using the vehicle as a ready anchor. A similar hitch mounted to the front of the vehicle could also be used. In FIG. 7, the tailgate is not affected. Instead the bracket 2 is mounted by way of the receiver hitch 30 below the bumper. The primary support 4 is mounted on a support beam 31 by way of a joining means which here comprises a hole 33 in the bottom of the support 4 into which a post 32 in the support beam 31 is inserted. The support beam 31 has a support foot 35 much like the brace arm 8. The support beam is attached to a receiver hitch beam 34 by way of a t-bar 36. This provides for greater spacing between the two brackets 2. The length of the t bar, and the ability to provide for more brackets 2 is provided by having extension beams 37 which may have beam posts 39 which may be inserted into beam holes 38 in the t bar 36 or in other extension beams to form a matrix of support beams and corresponding brackets 2. Since these support beams 21 may have scaffolding holes 23, a matrix for scaffolding is also provided.

As shown in FIG. 7, the bracket is modified so as to have a top portion which may be sealed at the rear with a roof 40, or a hinge 41 holding a cap 42 over the top of the rear portion of the slot 3 in bracket 2 so as to better secure the cutting surface 1.

There is a receiver hitch beam foot 43 which can be used to keep the sawhorse brackets 2 in place after the vehicle is used. There may also be extension feet 44 to support the extensions 37 which may be used to extend the length of the t-bar 36. The t-bar 36 as shown runs in either direction from the receiver hitch beam 34. It is obvious, however, that it may run in only one direction from the receiver hitch, either left, right or back. The only requirement is that either the receiver hitch beam 34 itself or the t-bar 36 hold at least two supports 4 so that a saw horse arrangement is possible.

FIG. 8 shows a close up of an alternative support/bracket arrangement shown in FIG. 1. In FIG. 8, at various locations, the holes 15 and 60 are rectangular and corresponding latches 60 are attached to the side (although they could be on the back or bottom) of the bracket 2 so that the beam latches 60 use the side of the brackets 2 and the weight of the brackets 2 to hold the bracket latched in place. Traditional carjacks function in this same fashion. Any jack-type arrangement, such as a hydraulic jack or a car-type jack could be utilized in order to raise and lower the height of the beam 2 so as to provide greater adjustment and to allow the level of the beams to be moved without effort when loaded. A bolt 47 through a nut 48 in the primary leg 19 and secondary leg 20 pass into holes 49 in the extensions 21 and 22 to adjust the height. A jack 50 is used to adjust the height as with a standard jack used on an automobile using a jack arm 51. A secondary scaffold hole 52 is available to allow square scaffolds to be erected in conjunction with scaffold hold 23.

All of the embodiments shown hold the cutting surface of the board at approximately 90 degrees to the face plane of the tailgate 11. However, a lesser angle might be utilized and still accomplish the desired result. This angle would preferably be for 30 degrees to 90 degrees. Similarly a single bracket might be used instead of two as long as a space for cutting was formed, although this would result in a significantly different invention. In the present embodiments, the ability to alter the spacing of the two cutting surfaces is a significant improvement.

Most specifically, the tailgate defines an opening 149 to receive a blade 115 and provides a cutting surface, the central frame and outer frames 140, 146, 143, 142, 160, 138 to hold the material, wood, steel, etc., which is to be cut, welded, etc. Significant to the invention is a central frame which attaches to the vehicle frame, preferably the tailgate of a vehicle. The attachment rod 160, to which the central frame 141 in the preferred embodiment is a magnetic bar which is useful on any tailgate as discussed in more detail below. This bar may be a non-magnetic bar bearing a magnetic strip located at the base of the tailgate. This magnetic strip or bar may also be removable for cleaning, etc. This would catch metal screws, etc, as they roll around in the truck bed. This strip could be located at other points within the truck bed for the same purpose.

In the embodiments shown, the attachment rod 160 receives the hinges 92 for the tailgate. In the manner known in the art for conventional tailgates, this invention is easily removable as is a conventional tailgate. The attachment rod 160 may be extendable or retractable along the length to fit different width truck beds.

The tool would typically be one which has a blade of some type which extends out of an opening defined by the central frame. The top of the central frame supports the item to be cut. The tool may either be suspended over the material and central frame opening or it may extend up from the bottom of the central frame into the opening. The blade may be movable within the central frame opening.

Examples of tools would be saws having saw blades, welders having welding tips, torches having torch valves (the flame being the blade); lasers having beams, drill having bits and the like. A drill held above the central frame opening so that the bits goes into the frame opening would be a predictable tool given the disclosure set out herein as would a saw moving on an arm over the opening in the central frame.

It can be seen, therefore, that while a saw and saw blade are discussed herein, blade refers to any type of blade, bit, torch, or the like attached not only to a saw but to a saw, a drill, or any type of cutting or welding device.

I claim:

1. A sawhorse mountable on a vehicle having a left side having a top and a bottom, a right side having a top and a bottom and a bed having a front and a rear running between the left side and the right side, a tailgate having a length, an inside, an outside, said tailgate rotatably mounted to the bottom of the left side and the bottom of the right side of the vehicle at the rear of the bed said sawhorse comprising:

(b) at least a first primary support mountable on the tailgate outside and a second primary support mountable on the tailgate outside approximately parallel to the first primary support;

(c) a first bracket adjustably mounted on the first primary support, said first bracket having at least three walls, said at least three walls, defining a slot defining an interior for receiving and holding a first cuttable member at a desired height outwardly from the vehicle; and a securing means for releasably holding the first cuttable member in the slot;

(d) a second bracket adjustably mounted on the second primary support, said second bracket having at least three walls, said three walls defining a slot for receiving and holding a second cuttable member outwardly from the vehicle at a desired height and approximately parallel to the cuttable member secured in the first bracket, a securing means for releasably holding the second cuttable member in the slot; and at least one cross-band extending between the primary supports.

2. A sawhorse mountable on a vehicle with a bumper said vehicle having a tailgate and a left side having a top and a bottom, a right side having a front and a bottom and a bed having a front and a rear running between the left side and the right side, said sawhorse comprising:

(a) at least a first primary support mountable on an outside of the tailgate outside and a second primary support mountable on the tailgate outside approximately parallel to the first primary support:

(b) a first bracket adjustably mounted on the first primary support, said first bracket having at least three walls, said at least three walls, defining a slot defining an interior for receiving and holding a first cuttable member at a desired height outwardly from the vehicle; and a securing means for releasably holding the first cuttable member in the slot;

(c) a second bracket adjustably mounted on the second primary support, said second bracket having at least three walls, said three walls defining a slot for receiving and holding a second cuttable member outwardly from the vehicle at a desired height and approximately parallel to the second cuttable member secured in the first bracket, and a securing means for releasably holding the second cuttable member in the slot and wherein the first and second brackets are made of metal, and the first and second cuttable members are made of wood and wherein the cuttable members have a perimeter; and wherein the cuttable members have a length and are longer than the slots and wherein the slot interiors are substantially the same size as the perimeter of the wood cuttable members; and an adjustable extension extending from at least one said primary support for bumper contact.

3. The sawhorse of claim 2, wherein the first and second cuttable members are two by fours.

4. The sawhorse of claim 2 wherein the respective brackets further comprise a jack connected between the each primary support and the slot and wherein the position of the bracket relative to the first primary supports can be adjusted by operating the jack.

5. The sawhorse of claim 1 wherein at least one of the first or the second brackets includes a fourth wall defining a covered slot wherein a cuttable member can be removably secured.

6. The sawhorse of claim 2 wherein the first primary support and second primary support further comprise a gripping means for releasably gripping the bumper.

7. The sawhorse of claim 2 further comprising a shade and a scaffold, wherein the scaffold comprises as least one scaffold arm, said at least one arm being mounted on and extending above the first primary support above the bracket and wherein the shade is mounted on the scaffold above the bracket.

8. The sawhorse of claim 2 wherein at least the first primary support includes:

(a) a primary leg supporting the first bracket;

(b) a secondary leg parallel to the primary leg;

(c) said adjustable extension behind a first adjustable extension extendably connected to the primary leg; and (d) a second adjustable extension extendably connected to the secondary leg;

(e) and an adjusting means for fixing the position of the first adjustable extension and second adjustable extension relative to the primary leg and secondary leg respectively.

9. The sawhorse of claim 8 wherein the adjustable extension further comprises a foot which contacts the bumper of the vehicle when the adjustable extension is extended.

* * * * *